(12) United States Patent
Takata et al.

(10) Patent No.: US 10,303,446 B2
(45) Date of Patent: May 28, 2019

(54) PROGRAM GENERATING METHOD, PROGRAM GENERATING DEVICE, AND RECORDING MEDIUM

(71) Applicant: Panasonic Intellectual Property Management Co., Ltd., Osaka (JP)

(72) Inventors: Kazutoyo Takata, Fukui (JP); Koji Morikawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/722,076

(22) Filed: Oct. 2, 2017

(65) Prior Publication Data

US 2018/0107460 A1  Apr. 19, 2018

Related U.S. Application Data

(60) Provisional application No. 62/409,080, filed on Oct. 17, 2016.

(30) Foreign Application Priority Data

Apr. 14, 2017 (JP) ................... 2017-080716

(51) Int. Cl.
  *G06F 8/34*      (2018.01)
  *G06T 3/60*      (2006.01)
  (Continued)

(52) U.S. Cl.
  CPC .............. *G06F 8/34* (2013.01); *G06F 16/532* (2019.01); *G06T 11/001* (2013.01); *G06T 11/20* (2013.01);
  (Continued)

(58) Field of Classification Search
  CPC ........ G06F 8/34; G06F 16/532; G06T 11/001; G06T 11/20; G06T 11/60; G06T 13/80; G06T 3/60
  (Continued)

(56) References Cited

U.S. PATENT DOCUMENTS 5,974,254 A * 10/1999 Hsu ........................... G06F 8/71
  714/37
2005/0041886 A1* 2/2005 Wada .................... G06F 16/532
  382/305

(Continued)

FOREIGN PATENT DOCUMENTS

JP     10-143663      5/1998
JP     2007-286945    11/2007
(Continued)

OTHER PUBLICATIONS

Iyer et al, "Three-dimensional shape searching: state-of-the-art review and future trends", [Online], 2004, pp. 509-530, [Retrieved from internet on Feb. 6, 2019], <http://citeseerx.ist.psu.edu/viewdoc/download?doi=10.1.1.214.7355&rep=rep1&type=pdf> (Year: 2004).*

(Continued)

*Primary Examiner* — Ziaul A Chowdhury
*Assistant Examiner* — Zengpu Wei
(74) *Attorney, Agent, or Firm* — Wenderoth, Lind & Ponack, L.L.P.

(57) ABSTRACT

A program generating method acquires a first image set, and retrieves a similar image that is similar to a processing target image included in the first image set, from a database. For each of N number of second image sets in the database, an integrated similarity of an image included in the second image set with respect to the processing target image is calculated based on a first similarity between the image included in the second image set and the processing target (Continued)

image, a second similarity between the second image set and the first image set, and the completeness of the first image set, and the similar image is retrieved based on the integrated similarity.

8 Claims, 21 Drawing Sheets

(51) Int. Cl.
    *G06T 11/00*     (2006.01)
    *G06T 11/20*     (2006.01)
    *G06T 11/60*     (2006.01)
    *G06T 13/80*     (2011.01)
    *G06F 16/532*     (2019.01)
(52) U.S. Cl.
    CPC .............. *G06T 11/60* (2013.01); *G06T 13/80* (2013.01); *G06T 3/60* (2013.01)
(58) Field of Classification Search
    USPC ........................................................ 717/113
    See application file for complete search history.

(56) References Cited

U.S. PATENT DOCUMENTS

| | | | | |
|---|---|---|---|---|
| 2007/0177807 A1* | 8/2007 | Enomoto | ........... | G06K 9/00288 382/224 |
| 2008/0303824 A1* | 12/2008 | Suzuki | ................. | G06F 17/211 345/467 |
| 2009/0060294 A1* | 3/2009 | Matsubara | ........ | G06F 17/30277 382/118 |
| 2010/0164877 A1* | 7/2010 | Yu | ........................... | G06F 9/451 345/173 |
| 2011/0249863 A1* | 10/2011 | Ohashi | ................. | G06T 11/001 382/103 |
| 2013/0051771 A1* | 2/2013 | Yamada | ............. | H04N 5/23245 386/278 |
| 2013/0094038 A1* | 4/2013 | Okamoto | ........... | H04N 1/00307 358/1.9 |
| 2013/0182002 A1* | 7/2013 | Macciola | ............... | H04N 1/387 345/589 |
| 2014/0153821 A1* | 6/2014 | Masuko | ............. | G06K 9/00422 382/162 |
| 2014/0304637 A1* | 10/2014 | Ijiri | ..................... | G06F 3/04842 715/771 |
| 2015/0310172 A1* | 10/2015 | Takata | ................... | G16H 50/70 382/128 |
| 2016/0055394 A1* | 2/2016 | Kanada | ................... | G06F 16/51 382/128 |
| 2016/0364878 A1* | 12/2016 | Guo | ...................... | G06K 9/6202 |
| 2018/0042468 A1* | 2/2018 | Teramura | .............. | G06T 7/0012 |
| 2018/0268207 A1* | 9/2018 | Kim | ........................ | G06T 13/80 |
| 2018/0330529 A1* | 11/2018 | Maruyama | ............... | H04N 9/07 |

FOREIGN PATENT DOCUMENTS

| | | |
|---|---|---|
| JP | 2011-119869 | 6/2011 |
| JP | 2013-257692 | 12/2013 |

OTHER PUBLICATIONS

Traina et al, "Image Domain Formalization for Content-Based Image Retrieval", [Online], 2005, pp. 604-609, [Retrieved from internet on Feb. 6, 2019], <http://delivery.acm.org/10.1145/1070000/1066818/p604-traina.pdf?ip=151.207.250.51&id=1066818&acc=ACTIVE%20SERVICE&key=C15944E53D0ACA63%2E4D4702B0C3E38B> (Year: 2005).*

Jia et al, "Object-Based Image Similarity Computation Using Inductive Learning of Contour-Segment Relations", [Online], 2000, pp. 80-87, [Retrieved form internet on Feb. 6, 2019], <https://ieeexplore.ieee.org/stamp/stamp.jsp?tp=&arnumber=817600> (Year: 2000).*

* cited by examiner

FIG. 3

| | | |
|---|---|---|
| MOTION | MOVE | CHANGE X COORDINATE BY [p1] |
| | MOVE MOVE | CHANGE X COORDINATE TO [p2] AND CHANGE Y COORDINATE TO [p3] IN [p4] SECONDS |
| | ROTATE | ROTATE [p5] DEGREES TO THE LEFT |
| APPEARANCE | DISPLAY TIME | DISPLAY TEXT FOR [p6] SECONDS |
| | DENSITY | COLOR (BRIGHTNESS) CHANGES BY [p7] |
| | SIZE | SIZE CHANGES BY [p8] |
| | TRANSPARENCY | CHANGE TRANSPARENCY BY [p9] |
| SOUND | RHYTHM | BEAT DRUM FOR [p10] BEATS |
| | VOLUME | CHANGE VOLUME BY [p11] |
| | TEMPO | CHANGE TEMPO BY [p12] |
| TEXT | COLOR | CHANGE COLOR OF TEXT BY [p13] |
| | THICKNESS | CHANGE THICKNESS OF TEXT BY [p14] |
| | DENSITY | CHANGE DENSITY OF TEXT BY [p15] |
| CONTROL | TIMER | WAIT FOR [p16] SECONDS |
| | NUMBER OF LOOPS | REPEAT [p17] TIMES |

FIG. 5

| USER ID | PROJECT ID | IMAGE ID | SCRIPT ID |
|---|---|---|---|
| x | x_P1 | I_x_P1_1 | S_x_P1_1 |
| | | I_x_P1_2 | S_x_P1_2 |
| | | I_x_P1_3 | S_x_P1_3 |
| | x_P2 | I_x_P2_1 | S_x_P2_1 |
| | | I_x_P2_2 | S_x_P2_2 |
| y | y_P1 | I_y_P1_1 | S_y_P1_2 |
| | y_P2 | I_y_P2_1 | S_y_P2_1 |
| | | I_y_P2_2 | S_y_P2_2 |
| ... | ... | ... | ... |

FIG. 14

| SECOND SIMILARITY Sw (INTER-SET SIMILARITY) | PROJECT ID | IMAGE ID | IMAGE ID OF MOST SIMILAR PARTIAL IMAGE | INTEGRATED SIMILARITY St |
|---|---|---|---|---|
| 0.95 | m_P5 | I_m_P5_1, I_m_P5_2, I_m_P5_3, I_m_P5_4 | I_m_P5_1 | 0.90 |
| 0.91 | k_P3 | I_k_P3_1, I_k_P3_2, I_k_P3_3, I_k_P3_4 | I_k_P3_3 | 0.79 |
| 0.89 | q_P1 | I_q_P1_1, I_q_P1_2, I_q_P1_3, I_q_P1_4 | I_q_P1_4 | 0.95 |
| 0.75 | d_P8 | I_d_P8_1, I_d_P8_2, I_d_P8_3, I_d_P8_4 | I_d_P8_2 | 0.83 |
| ... | ... | ... | ... | ... |

PROGRAM GENERATING METHOD, PROGRAM GENERATING DEVICE, AND RECORDING MEDIUM

BACKGROUND

1. Technical Field

The present disclosure relates to a program generating method and the like that generate a computer program for changing an image.

2. Description of the Related Art

Presently, there are provided visual programming languages with which programming is possible by means of visual operations without having to write source code. Scratch developed by MIT Media Lab is a visual programming language for children. Scratch allows a beginner such as a child to generate a program without learning how to write correct syntax or the like. For example, Scratch provides visual blocks as commands for generating a program. A user such as a child draws an image, and selects and combines one or more visual blocks from among the provided visual blocks to be applied to the image drawn by the user. In addition, the user edits values of parameters of the selected visual blocks. A computer program (script) for the drawn image is thereby generated. By executing the resultant computer program, the image drawn by the user changes in a manner similar to an animation.

Such a program generating method that uses Scratch enables children to produce, for example, a playful interactive animations. Such experience leads to enhancing their motivation to learn programming.

SUMMARY

However, in the aforementioned program generating method of the related art, there is a problem in that a complicated task is required for a user to generate a computer program.

Thus, one non-limiting and exemplary aspect of the present disclosure provides a program generating method capable of allowing a user to easily generate a computer program for changing an image.

In one general aspect, the techniques disclosed here feature a program generating method that includes: (a) acquiring a first image set including one or more images displayed on a display; (b) accessing a recording medium storing N (N≥2) number of second image sets and computer programs, each of the computer programs being associated with a corresponding one of one or more images respectively included in the N number of second image sets and being used to change the corresponding one of the one or more images; (c) retrieving, from the recording medium, one or more similar images that are similar to a processing target image included in the first image set; and (d) generating, as an application program, a computer program to be applied to the processing target image, by selecting one computer program from the computer programs, each of the computer programs being associated with a corresponding one of the one or more retrieved similar images in the recording medium, in (c), (c1) for each of the N number of second image sets stored in the recording medium, an integrated similarity of an image included in the second image set with respect to the processing target image being calculated based on a first similarity between the image included in the second image set and the processing target image, a second similarity between the second image set and the first image set, and a completeness of the first image set, and (c2) the one or more similar images being retrieved based on the integrated similarities calculated for the images respectively included in the N number of second image sets stored in the recording medium.

It should be noted that general or specific aspects hereof may be realized by a device, a system, a method, an integrated circuit, a computer program, or a computer-readable recording medium, and may be realized by an arbitrary combination of a device, a system, a method, an integrated circuit, a computer program, and a recording medium. A computer-readable recording medium includes a nonvolatile recording medium such as a compact disc read-only memory (CD-ROM), for example.

According to the present disclosure, it is possible for a user to easily generate a computer program for changing an image. Additional benefits and advantages of the aspects of the present disclosure will become apparent from the present specification and drawings. The benefits and/or advantages may be individually provided by the various aspects and features disclosed in the present specification and drawings, and need not all be necessary in order to obtain one or more of the same.

BRIEF DESCRIPTION OF THE DRAWINGS

FIG. 3 is a drawing depicting an example of a command list in the embodiment;

FIG. 5 is a drawing depicting associations between data stored in a database in the embodiment;

FIG. 14 is a drawing depicting an example of the similar image list in the embodiment;

Figure 1:
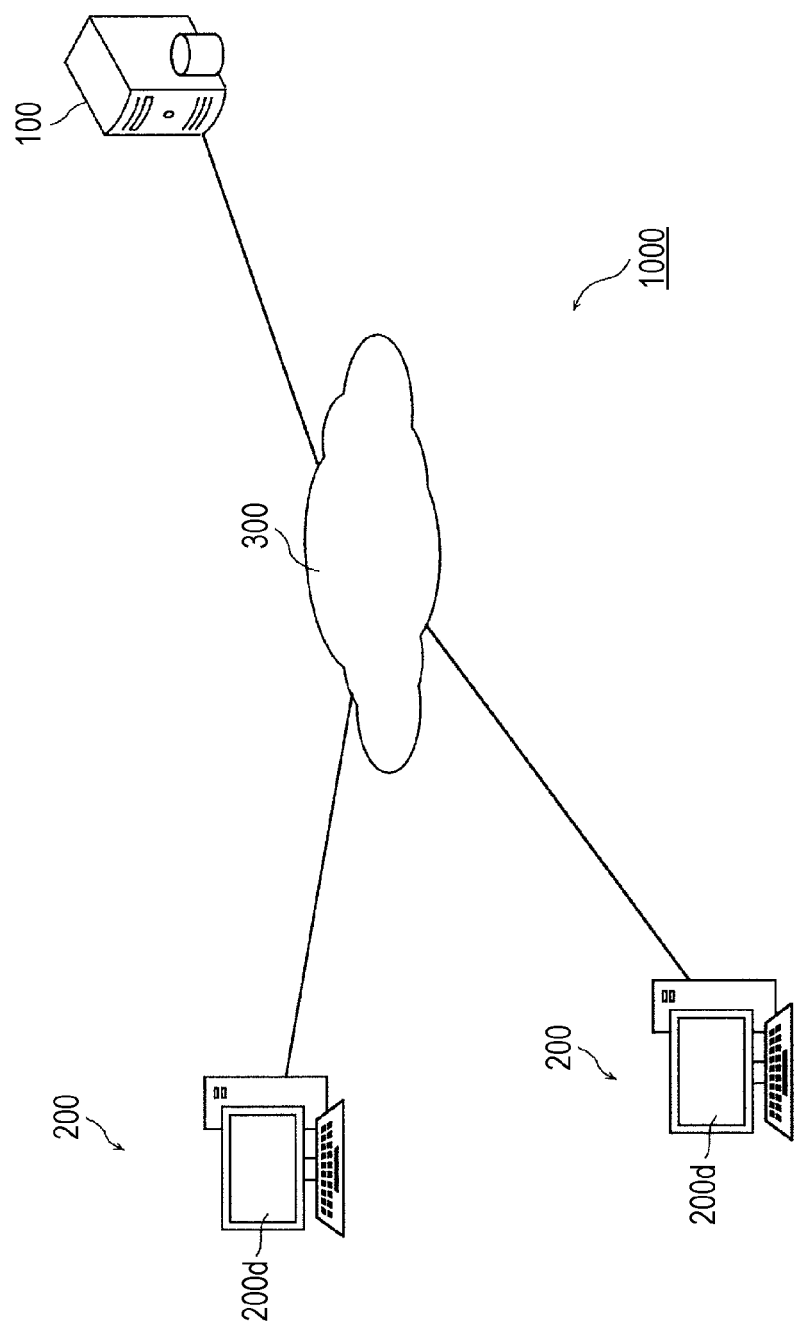
FIG. 1 is a drawing depicting a configuration of a program generating system in an embodiment.

DETAILED DESCRIPTION (Findings Forming the Basis for the Present Disclosure)

The present inventor discovered that the following problems occur in relation to Scratch described in the "Description of the Related Art" section.

As mentioned above, Scratch provides several types of commands that are computer programs for changing respective images. The user uses an input means (a mouse and/or a keyboard, for example) to select an image and/or draw an image, thereby causing the image to be displayed on a display as an input image. Next, the user selects one or more commands to be applied to the input image from among the provided types of commands. The user than sets a value of a parameter included in each of the selected one or more commands. The value of the parameter indicates a degree to which the image is to be changed. The input image is thereby changed in proportion to the degree indicated by the value of the set parameter by executing a script including the one or more selected commands.

However, a user is bothered to select and combine commands to be applied to the input image from the provided several types of commands. Thus, automatic generation of a program (script) to be applied to the input image reduces such a bother greatly. One of the ideas to automatically generate the program (script) to be applied to the input image is to retrieve a program that is suitable for the input image from a database prepared in advance. For example, if there is a program that has already been generated for an image that is similar to the input image, the program to be applied to the input image could be automatically generated by retrieving the aforementioned program.

However, it is necessary to appropriately determine whether there are any images that are similar to the input image, and if there is an error in that determination, there is a problem in that a program that is suitable for the input image cannot be generated.

In order to solve a problem such as this, a program generating method according to an aspect of the present disclosure includes: (a) acquiring a first image set including one or more images displayed on a display; (b) accessing a recording medium storing N (N≥2) number of second image sets and computer programs, each of the computer programs being associated with a corresponding one of one or more images respectively included in the N number of second image sets and being used to change the corresponding one of the one or more images; (c) retrieving, from the recording medium, one or more similar images that are similar to a processing target image included in the first image set; and (d) generating, as an application program, a computer program to be applied to the processing target image, by selecting one computer program from the computer programs each of which is associated with a corresponding one of the one or more retrieved similar images in the recording medium, in (c), (c1) for each of the N number of second image sets stored in the recording medium, an integrated similarity of an image included in the second image set with respect to the processing target image being calculated based on a first similarity between the image included in the second image set and the processing target image, a second similarity between the second image set and the first image set, and a completeness of the first image set, and (c2) the one or more similar images being retrieved based on the integrated similarities calculated for the images respectively included in the N number of second image sets stored in the recording medium. For example, the first similarity may be the largest similarity from among similarities between each of the one or more images included in one of the second image sets and the processing target image. Furthermore, for example, in (c2), images having a calculated integrated similarity that is equal to or greater than a first threshold value, in each of the N number of second image sets stored in the recording medium, may be retrieved as the similar images.

Thus, one or more similar images that are similar to the processing target image drawn as an input image are retrieved, and one computer program is selected as an application program from the computer programs each of which is associated with the corresponding one of the one or more similar images. As a result, a computer program to be applied to the processing target image is automatically generated. Consequently, it is not necessary for the user who has drawn the input image on the display to create a computer program to be applied to the input image by combining two or more types of commands prepared in advance. As a result, it is possible to easily generate a computer program for changing the input image.

Furthermore, in the program generating method according to an aspect of the present disclosure, integrated similarities of images included in the second image sets with respect to the processing target image are calculated based on a first similarity, a second similarity, and the completeness of the first image set. That is, integrated similarities that are based on an overall similarity, a partial similarity, and the completeness of the first image set are calculated, and similar images are retrieved using the integrated similarities.

For example, in the case where an image depicting a ball is included in a second image set, and the processing target image of the first image set depicts a ball, the image included in the second image set and the processing target image are similar to each other if only those images are compared. However, the entire second image set may depict a baseball scene, for example, and the entire first image set may depict a tennis or golf scene, for example. In a case such as this, it cannot be said that the image depicting the ball included in the second image set is similar to the processing target image depicting the ball included in the first image set. Furthermore, the reliability of the overall similarity between the second image set and the first image set is low if the completeness of the first image set is low, and, conversely, the reliability of the overall similarity between the second image set and the first image set is high if the completeness of the first image set is high.

Thus, in the program generating method according to an aspect of the present disclosure, as mentioned above, integrated similarities that are based on not only the overall similarity and the partial similarity but also the completeness of the first image set are calculated, and similar images are retrieved using the integrated similarities. Consequently, appropriate similar images can be retrieved with respect to the processing target image. As a result, a computer program that is more suitable for the processing target image can be generated.

Furthermore, in (c1), the integrated similarity may be calculated by calculating the sum of the product of the first similarity and a first weight and the product of the second similarity and a second weight, the first weight being a value that decreases as the completeness increases, and the second weight being a value that increases as the completeness increases.

Thus, the first similarity and the second similarity can be appropriately weighted and added according to the completeness of the first image set. As a result, the reliability of an integrated similarity can be increased, and a computer program that is more suitable for the processing target image can be generated.

Furthermore, the completeness may be the ratio of the elapsed time from the drawing of the first image set being started with respect to a reference time, or the ratio of the number of images included in the first image set with respect to a reference number.

For example, the reference time is the average time from the drawing of one image set being started to completion, and the reference number is the average number of images included in one completed image set. Thus, the completeness of the first image set can be indicated as an appropriate numerical value, and the reliability of the integrated similarity can be further increased.

Furthermore, when the completeness is equal to or less than a second threshold value, the first weight may be 1 and the second weight may be 0, and when the completeness exceeds the second threshold value, the first weight may be 0 and the second weight may be 1.

Thus, since the first weight and the second weight are represented by binary values of 0 or 1, the processing load for calculating the integrated similarity can be reduced.

Furthermore, in (d), M (N>M≥1) number of second image sets that respectively include similar images may be specified from the N number of second image sets stored in the recording medium, the second image set having the largest calculated second similarity may be selected from the M number of second image sets, the similar image that is the image having the largest similarity with the processing target image may be specified from the selected second image set, and the application program may be generated by selecting the computer program associated with the specified similar image in the recording medium.

Thus, one or more retrieved similar images can be appropriately narrowed down to one image. Consequently, a computer program that is suitable for the processing target image can be easily generated.

Furthermore, in (d), M (N>M≥2) number of second image sets that respectively include similar images may be specified from the N number of second image sets stored in the recording medium, only computer programs having feature values that are different from each other by at least a third threshold value may be presented as candidate programs from among the computer programs associated with the similar images respectively included in the M number of second image sets in the recording medium, the application program may be generated by selecting one of the candidate programs from among the presented candidate programs, and the similar images respectively included in the M number of second image sets may be the images having the largest similarity with the processing target image in the second image set.

Thus, since computer programs are presented as candidate programs, the user is able to select a preferable computer program as the application program from the candidate programs. Furthermore, the presented candidate programs have feature values that are different from each other by at least the third threshold value. That is, the candidate programs are not similar to each other. Consequently, it is possible to suppress a large number of similar candidate programs being presented, and it is possible to increase the range of choices for computer programs for the user.

Furthermore, in (d), the feature values of the computer programs associated with the similar images respectively included in the M number of second image sets in the recording medium may be derived as vectors, and only the computer programs that have vectors of a cosine distance that is less than a fourth threshold value with respect to each other may be presented as the candidate programs from among the M number of computer programs respectively having the derived vectors.

Thus, similar computer programs can be appropriately excluded from the M number of computer programs, and only computer programs that are not similar to each other can be presented as candidate programs.

In order to solve the above-mentioned problem occurred in relation to Scratch, a program generating method according to an aspect of the present disclosure includes: (a) obtaining a first image, including first pictures, that is prepared by a user and displayed on a display, the preparation including the user drawing, coloring, and/or copying using one or more input devices; (b) receiving information indicating a picture designated from among the first pictures by the user; (c) receiving a first time indicating how much time has been taken for the preparation; (d) calculating a completion value by dividing the first time by a predetermined time; (e) calculating a first weight value and a second weight value using the completion value, the first weight value being a first value and the second weight value being a second value when the completion value is bigger than a predetermined value, the first weight value being a third value and the second weight value being a fourth value when the completion value is equal to or smaller than the predetermined value, the first value being smaller than the second value, and the third value being bigger than the fourth value; (f) accessing a recording medium storing computer programs and second images including second pictures, the second pictures each corresponding to the computer programs, each of the computer programs being used to change the corresponding picture, each of the second images including third pictures that are included in the second pictures; (g) calculating first similarity values, each of the first similarity values being a similarity value between the designated picture and one of the second pictures, first similarity values each corresponding to the second pictures; (h) selecting second similarity values from among the first similarity values, each of the second similarity values being selected from among similarity values, included in the first similarity values, corresponding to the third pictures and a highest similarity value among the selected similarity values, the second similarity values each corresponding to the second images; (i) calculating third similarity values, each of the third similarity values being a similarity value between the first image and one of the second images, the third similarity values each corresponding to the second images; (j) calculating fourth similarity values, each of the fourth similarity values being obtained by adding a fifth value and a sixth value, the fifth value being obtained by multiplying the first weight by a second similarity value included in the second similarity values, the sixth value being obtained by multiplying the second weight by a third similarity value, corresponding to the second similarity value, included in the third similarity values, and the fourth similarity values each corresponding to the second images; (k) checking whether each of the fourth similarity values is equal to or bigger than a predetermined value and selecting a second image, included in the second images, corresponding to each of the fourth similarity values when the checking result is affirmed; (l) selecting a third image from among one or more second images selected, the third image having a highest similarity value among similarity values between the first image and the one or more second images selected; (m) selecting a third picture from among pictures included in the third image, the third picture having a highest similarity value among similarity values between the designated picture and the pictures included in the third image; and (n) outputting a computer program, from among the computer programs, corresponding to the third picture, to display to the user. Thus, the computer program for changing the first image including first pictures is automatically generated. Consequently, it is not necessary for the user who has drawn the first image including first pictures on the display to create the computer program for changing the first image including first pictures by combining two or more types of commands prepared in advance. Hereinafter, an embodiment will be described in a specific manner with reference to the drawings.

It should be noted that the embodiments described hereinafter all represent general or specific examples. The numerical values, the shapes, the materials, the constituent elements, the arrangement positions and modes of connection of the constituent elements, the steps, and the order of the steps and the like given in the following embodiments are examples and are not intended to limit the present disclosure. Furthermore, from among the constituent elements in the following embodiments, constituent elements that are not mentioned in the independent claims indicating the most significant concepts are described as optional constituent elements.

Furthermore, each drawing is a schematic view and is not always depicted in an exact manner. Furthermore, in each drawing, the same constituent members are denoted by the same reference numbers.

(Embodiment)
[System]

FIG. 1 depicts a configuration of a program generating system in the present embodiment.

A program generating system 1000 in the present embodiment includes a program generating device 100, terminal devices 200, and a communication network 300, as is depicted in FIG. 1, for example.

Each of the terminal devices 200 may include a personal computer, a smartphone, and a tablet terminal. Furthermore, each of the terminal devices 200 displays an input image on a display 200d of the terminal device 200 in accordance with an operation by a user.

The communication network 300 may be a wide area network (WAN), a local area network (LAN), or the Internet, and communicably connects the program generating device 100 and each of the terminal devices 200 to each other.

The program generating device 100 communicates with a terminal device 200 via the communication network 300, and generates a computer program for changing the input image displayed on the display 200d of the terminal device 200. The program generating device 100 in the present embodiment generates a script as the computer program.

Figure 2:
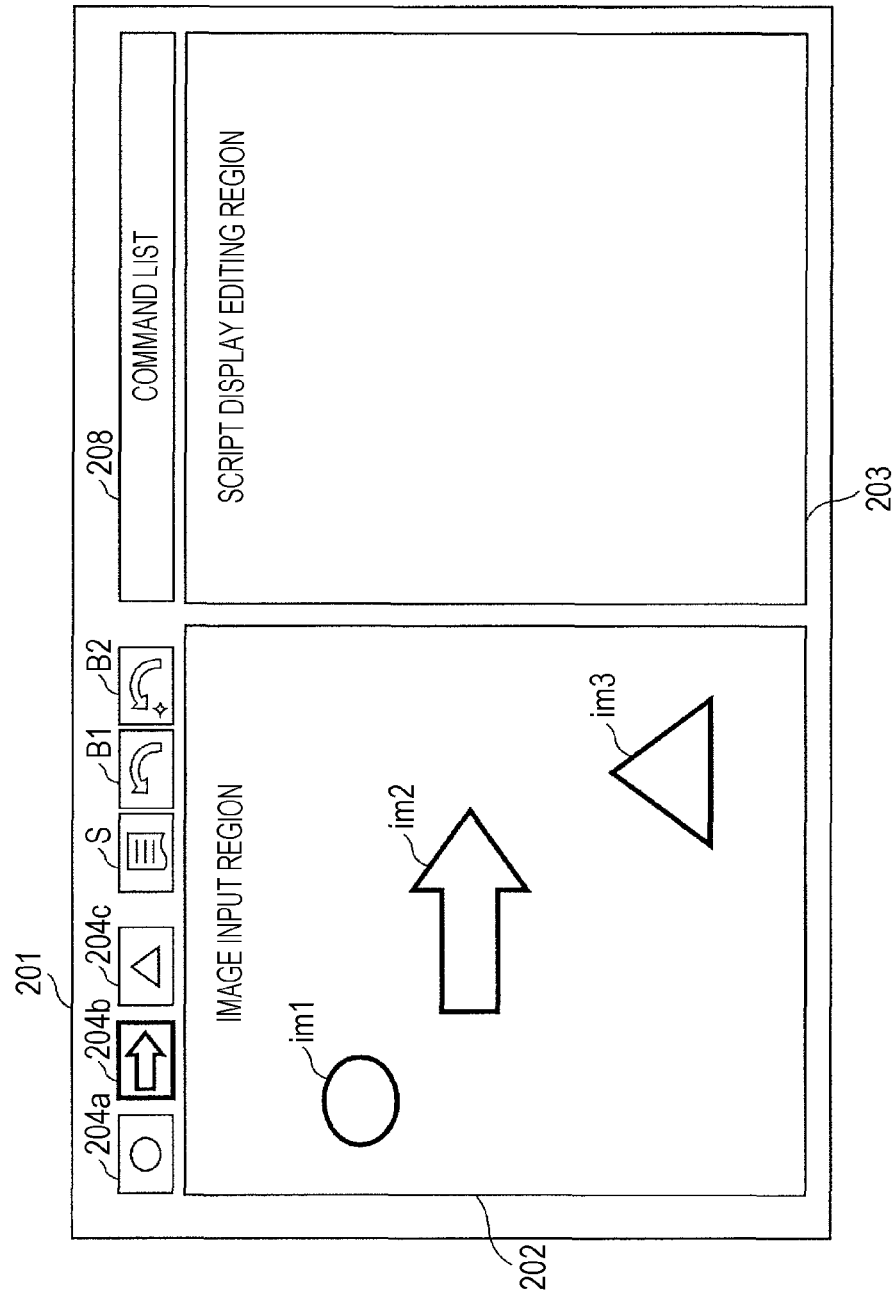
FIG. 2 is a drawing depicting an example of a screen displayed on a display of a terminal device in the embodiment.

FIG. 2 depicts an example of a screen displayed on the display 200d of the terminal device 200.

The program generating device 100 displays a script generating screen 201 for generating the script, on the display 200d of the terminal devices 200 via the communication network 300.

The script generating screen 201 includes an image input region 202, a script display editing region 203, image selection buttons 204a to 204c, operation buttons S, B1, and B2, and a command list button 208.

Input images im1 to im3, which have been drawn in accordance with operations performed by the user with respect to the terminal device 200, are displayed in the image input region 202. It should be noted that, hereinafter, an operation performed by the user with respect to the terminal device 200 is referred to as an input operation.

The image selection buttons 204a to 204c are respectively used to select the input images im1 to im3 displayed in the image input region 202. For example, when the image selection button 204a is selected in accordance with an input operation, the input image im1 from among the input images im1 to im3 displayed in the image input region 202 is selected as a processing target image. For example, if an input operation is performed, the program generating device 100 performs processing corresponding to the input operation with respect to the processing target image. Specifically, the program generating device 100 executes a script generated with respect to the processing target image, displays the script on the display 200d of the terminal device 200, and amends or edits the processing target image or the script. It should be noted that the program generating device 100 may treat a newly drawn input image as a processing target image even without the input image being selected using the image selection buttons.

A script generated with respect to the processing target image is displayed in the script display editing region 203. Furthermore, values of parameters included in the script displayed in the script display editing region 203 are amended or edited in accordance with an input operation.

The operation button S is used to cause the program generating device 100 to generate a script for the processing target image. That is, when the operation button S is selected by means of an input operation, the terminal device 200 instructs the program generating device 100 to generate a script via the communication network 300. The program generating device 100, upon receiving that instruction from the terminal device 200, generates a script with respect to the processing target image.

The operation button B1 is used to amend or edit the processing target image displayed in the image input region 202. That is, when the operation button B1 is selected by means of an input operation, the terminal device 200 instructs the program generating device 100 to amend the processing target image via the communication network 300. The program generating device 100, upon receiving that instruction from the terminal device 200, enters a state of waiting for information, from the terminal device 200, related to an input operation to be performed to amend or edit the processing target image.

The operation button B2 is used to add a new input image in the image input region 202. That is, when the operation button B2 is selected by means of an input operation, the terminal device 200 instructs, via the communication network 300, the program generating device 100 to add a new input image. The program generating device 100, upon receiving the instruction to add the new input image from the terminal device 200, enters a state of waiting for an image that is newly drawn to be given as an input image in accordance with an input operation. The terminal device 200 also enters a state of waiting for the newly drawn image to be given as the input image via the input operation, and displays, in the image input region 202, a new input image that is drawn in accordance with an input operation during the waiting.

The command list button 208 is used to display a command list (also referred to as a script control function list) including two or more types of commands that can be used by the program generating device 100. That is, when the command list button 208 is selected by means of an input operation, the terminal device 200 instructs the program generating device 100 to display the command list via the communication network 300. The program generating device 100, upon receiving the instruction to display the command list from the terminal device 200, displays the command list on the display 200d of the terminal device 200. The terminal device 200 may select one or more commands to be applied to the input image, from among the command list in accordance with an input operation.

FIG. 3 depicts an example of the command list.

For example, the command list includes types of commands belonging to "motion", types of commands belonging to "appearance", types of commands belonging to "sound", types of commands belonging to "text", types of commands belonging to "control", or the like.

The commands belonging to "motion" are computer programs for moving an input image. For example, the commands belonging to "motion" include the command "change X coordinate by [p1]" and the command "rotate [p5] degrees to the left". Furthermore, the commands belonging to "control" include "repeat [p17] times" and the like. Here, [pn] (n being an integer that is equal to or greater than 1) included in each command is a value of a parameter indicating the degree of change for an image, sound, or the like. In the present embodiment, the parameter included in each command is predetermined.

In the case where a command is selected in accordance with an input operation from the command list depicted in FIG. 3, the program generating device 100 may generate a new script to be applied to an input image, by changing a value of the parameter of the selected command in accordance with the input operation.

Here, in the present embodiment, a first image set is made up of one or more input images drawn in the image input region 202. That is, a first image set includes the images drawn over the entire image input region 202, in other words, a first image set is an overall image. Furthermore, each input image included in a first image set is a partial image making up the overall image.

[Device Configuration]

Figure 4:
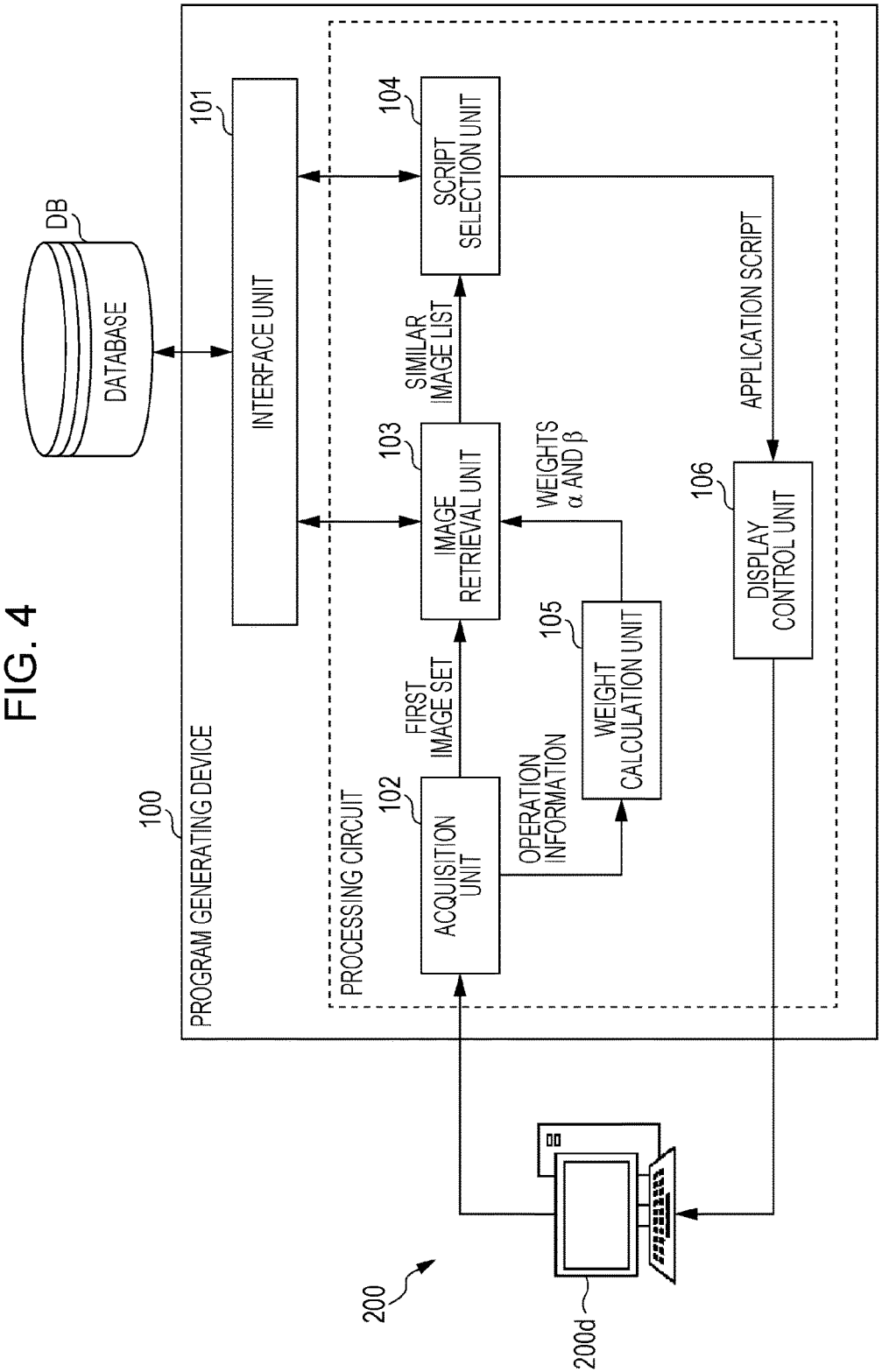
FIG. 4 is a block diagram depicting a configuration of a program generating device in the embodiment.

FIG. 4 is a block diagram depicting a configuration of the program generating device 100 in the embodiment.

The program generating device 100 is a device that generates, as a script, a computer program for changing a displayed image. The program generating device 100 includes an interface unit 101, an acquisition unit 102, an image retrieval unit 103, a script selection unit 104, a weight calculation unit 105, and a display control unit 107. It should be noted that the acquisition unit 102, the image retrieval unit 103, the script selection unit 104, the weight calculation unit 105, and the display control unit 107 from among the aforementioned constituent elements provided in the program generating device 100 are provided in a processing circuit, excluding the interface unit 101.

The interface unit 101 functions for the image retrieval unit 103 and the script selection unit 104 of the program generating device 100 to access a database DB. Specifically, the interface unit 101 may be a Universal Serial Bus (USB) terminal, a High-Definition Multimedia Interface (HDMI (registered trademark)) terminal, or a wireless communication device.

The database DB is a recording medium that stores N (N≥2) number of second image sets, and scripts, each of the scripts being associated with a corresponding one of one or more images respectively included in the N number of second image sets. Each of the scripts is used to change the corresponding one of the one or more images. It should be noted that each image set included in the N number of second image sets is equivalent to the aforementioned overall image, and the one or more images included in the respective image sets included in the N number of second image sets are equivalent to the partial images making up the overall image. Furthermore, each of the scripts stored in the database DB is equivalent to one of, or a combination of two or more of, the commands included in the aforementioned command list.

The acquisition unit 102 acquires a first image set that includes one or more images drawn on the display 200d of the terminal device 200. Each of the one or more images is an aforementioned input image, in other words, a partial image making up an overall image represented by the first image set. Hereinafter, the input image will be referred to as a partial image.

Furthermore, the acquisition unit 102 acquires, from the terminal device 200, an instruction corresponding to an input operation such as a selection of the operation button S. In addition, the acquisition unit 102 acquires, from the terminal device 200, operation information indicating an input operation carried out in order to draw an image in the image input region 202. It should be noted that, for example, the type and parameter of an input operation, the time and date on which the input operation was carried out, and the like are indicated in the operation information.

The weight calculation unit 105 sequentially acquires operation information from the terminal device 200 via the acquisition unit 102, and from the operation information, derives a first weight α and a second weight β that correspond to the completeness of the first image set.

The image retrieval unit 103 accesses the database DB via the interface unit 101. The image retrieval unit 103 then uses the first weight α and the second weight β derived by the weight calculation unit 105, to retrieve, from the database DB, one or more similar images that are similar to the processing target image included in the first image set. It should be noted that the processing target image is a partial image that has been selected by means of a button such as the image selection buttons 204a to 204c from among the one or more partial images included in the first image set.

The script selection unit 104 accesses the database DB via the interface unit 101. The script selection unit 104 then selects a script from one or more scripts associated with the one or more retrieved similar images in the database DB, and thereby generates a script to be applied to the processing target image as an application script (in other words, an application program).

The display control unit 107 executes the generated application script, and thereby changes the processing target image displayed on the display 200d of the terminal device 200. Furthermore, the display control unit 107 displays the generated application script on the display 200*d* of the terminal device 200. That is, the application script is displayed in the script display editing region 203 of the script generating screen 201.

[Database]

FIG. 5 depicts associations between data stored in the database DB in the present embodiment.

Each image stored in the database DB has assigned thereto an image ID that is an identifier for identifying the image. In addition, each script stored in the database DB also has assigned thereto a script ID that is an identifier for identifying the script. Consequently, in the database DB, for example, the script having the script ID "S_x_P1_1" is associated with the image having the image ID "I_x_P1_1", as is depicted in FIG. 5. Furthermore, the script having the script ID "S_x_P1_2" is associated with the image having the image ID "I_x_P1_2".

Furthermore, in the present embodiment, a project is configured by combining a second image set that includes one or more images, and one or more scripts that are respectively associated with the one or more images. Furthermore, such a project is generated by the user of each terminal device 200, for example, and is stored in the database DB. That is, a project is configured from all of the partial images drawn in the image input region 202 by a user and scripts, each corresponding to the partial images, generated by the user. This project is then stored in the database DB. Thus, in the database DB, each project has assigned thereto a project ID that is an identifier for identifying the project. In addition, a user who has generated a project has assigned thereto a user ID that is an identifier for identifying the user. In the database DB, image IDs are grouped according to the project ID thereof, and project IDs are grouped according to the user ID thereof. That is, each of the one or more images included in one project is associated with the project, and each of one or more projects generated by a user is associated with the user.

Here, as mentioned above, the database DB stores N number of second image sets, and scripts each of which is associated with a corresponding one of one or more images respectively included in the N number of second image sets. Each of the N number of second image sets is a set of one or more images included in a project. That is, the database DB stores, for each of the N number of projects, scripts that are associated with respective images included in the project in question.

Furthermore, in the present embodiment, each of the one or more images included in a second image set indicates not only an image but also the location, size, orientation, and the like of that image in the image input region 202. Consequently, by combining the one or more images, a second image set is configured as an overall image having the size of the image input region 202.

Figure 6:
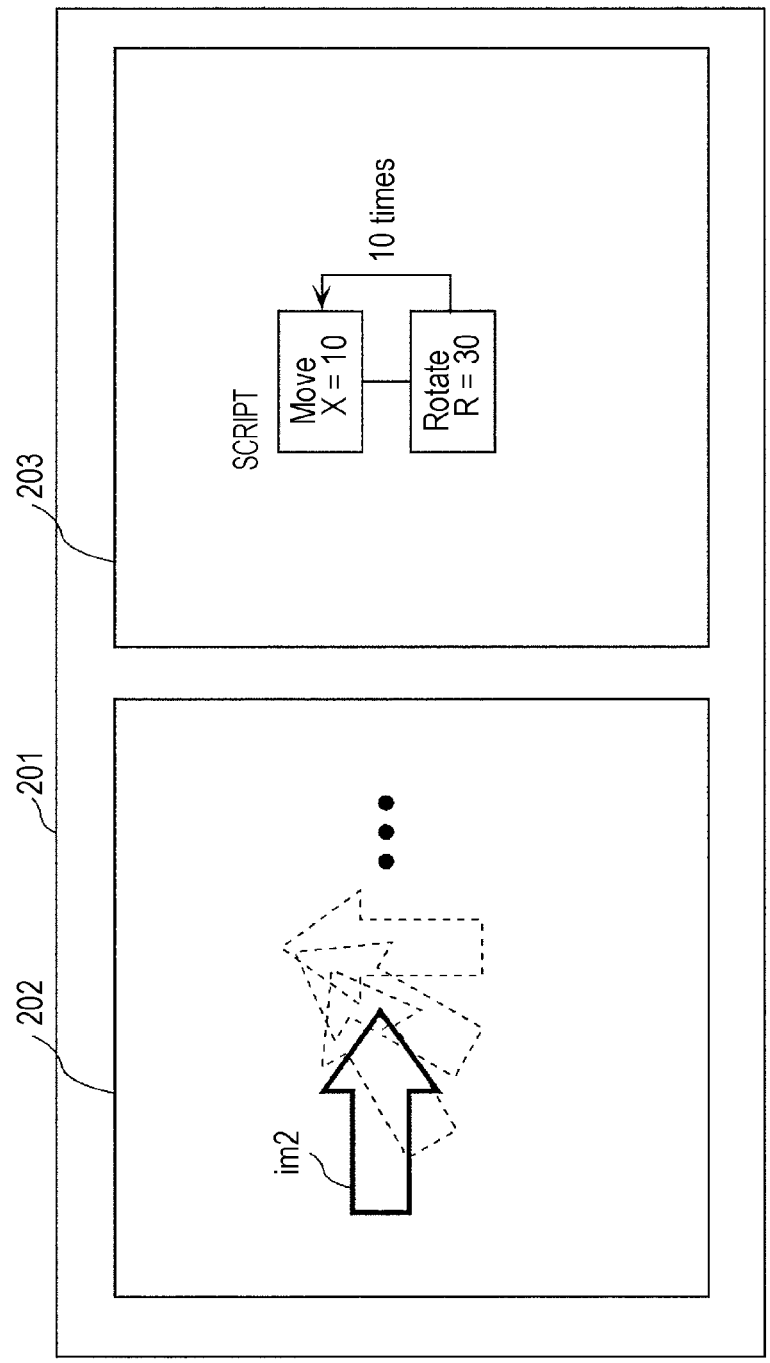
FIG. 6 is a drawing depicting an example of a script generated by the program generating device in the embodiment.

FIG. 6 depicts an example of a script generated by the program generating device 100. It should be noted that FIG. 6 depicts the script generating screen 201 but omits configurations other than the image input region 202 and the script display editing region 203.

For example, the user draws an image im2 of an arrow in the image input region 202 by means of an input operation. The acquisition unit 102 of the program generating device 100 acquires the image im2 as a processing target image, and the image retrieval unit 103 retrieves an image that is similar to the processing target image im2, from the database DB as a similar image. The program generating device 100 in the present embodiment selects the script associated with the similar image from the database DB, and generates an application script. For example, the application script is composed of "change X coordinate by [10]", "rotate [30] degrees to the left", and "repeat [10] times". It should be noted that the numerical values in brackets included in this script are values of parameters indicating a degree of change for the image. The display control unit 107 of the program generating device 100 then displays the generated application script in the script display editing region 203, and executes the application script. As a result, the processing target image im2 displayed in the image input region 202 changes according to the script.

Here, the image retrieval unit 103 in the present embodiment retrieves a similar image using a first similarity, a second similarity, a first weight α, and a second weight β, in such a way that an application script that is suitable for the processing target image im2 is generated. That is, the image retrieval unit 103 calculates an integrated similarity of an image included in a second image set with respect to the processing target image im2 on the basis of the first similarity, the second similarity, and the completeness of the first image set. The first similarity is the similarity between each of images respectively included in the N number of second image sets stored in the database DB, and the processing target image. The second similarity is the similarity between a second image set and the first image set. In addition, the image retrieval unit 103 retrieves one or more similar images on the basis of the integrated similarity, which is calculated for images respectively included in the N number of second image sets stored in the database DB.

That is, the image retrieval unit 103 in the present embodiment retrieves a similar image using not only the similarity between the processing target image im2 of the first image set and the images stored in the database DB, but also the similarity between the first image set and the second image sets, in other words, the similarity between overall images.

Figure 7:
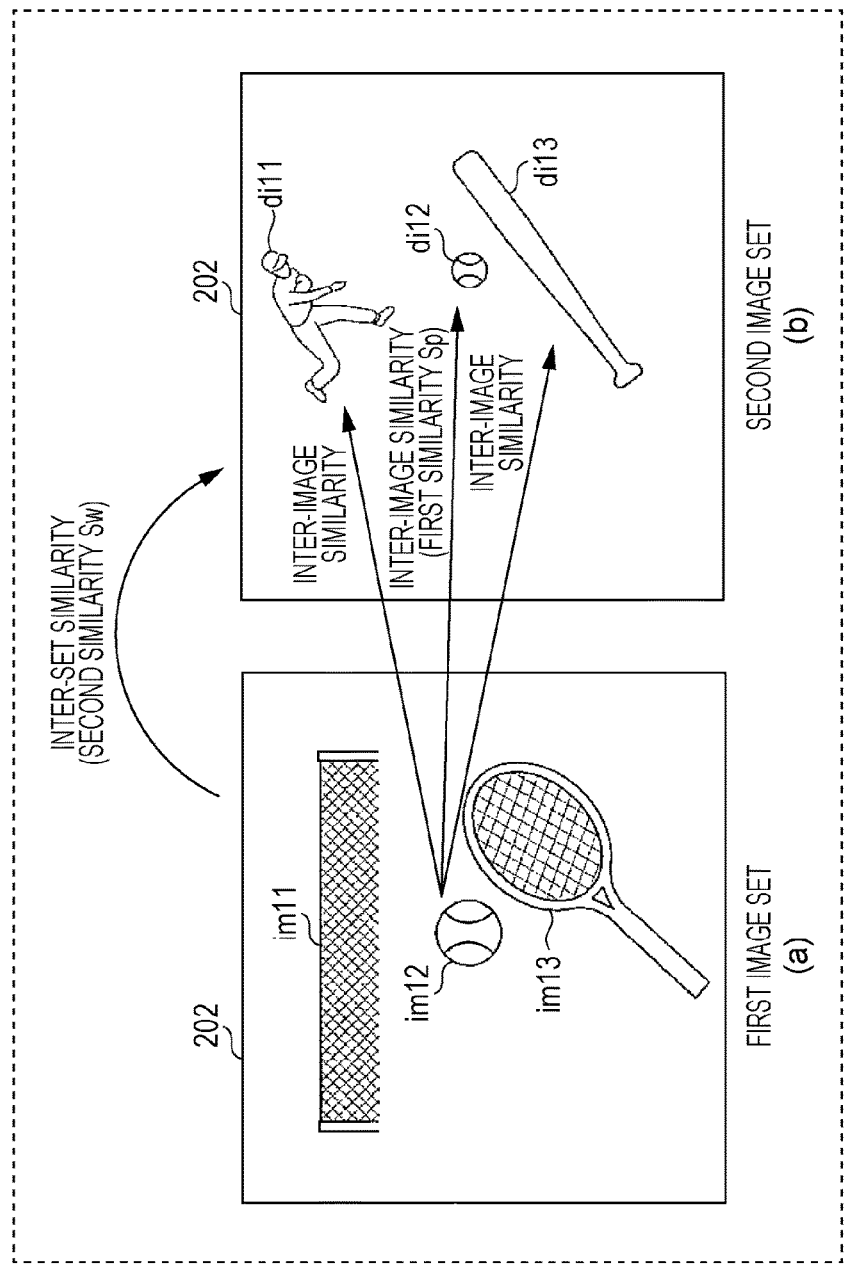
FIG. 7 is a drawing depicting each similarity used in the retrieval of a similar image by an image retrieval unit in the embodiment.

FIG. 7 depicts each similarity used in the retrieval of a similar image by the image retrieval unit 103.

For example, as is depicted in FIG. 7(*a*), a first image set that includes three partial images im11 to im13 is drawn in the image input region 202. The first image set depicts a tennis scene, the partial image im11 depicts a net arranged in a tennis court, the partial image im12 depicts a tennis ball, and the partial image im13 depicts a tennis racket. Here, by means of input operations, the partial image im12 is selected as the processing target image, and the operation button S for instructing the generation of a script is also selected. Thus, the image retrieval unit 103 of the program generating device 100 acquires a second image set, as is depicted in FIG. 7(*b*), stored in the database DB, for example. The second image set depicts a baseball scene, for example, and includes images di11 to di13. The image di11 depicts a baseball pitcher, the image di12 depicts a baseball ball, and the image di13 depicts a baseball bat. The image retrieval unit 103 then calculates the inter-image similarity between any one image from among the images di11 to di13 included in the second image set, and the processing target image im12, as a first similarity Sp.

Specifically, the first similarity is the largest similarity from among the similarities between each of the images di11 to di13 included in the second image set and the processing target image im12. For example, in the case where the inter-image similarity between the image di12 and the processing target image im12 is the largest, the image retrieval unit 103 calculates that inter-image similarity as the first similarity Sp. In addition, the image retrieval unit 103 calculates an inter-set similarity between the first image set depicted in FIG. 7(a) and the second image set depicted in FIG. 7(b) as a second similarity Sw.

In addition, the image retrieval unit 103 derives a numerical value corresponding to the number of partial images im11 to im13 included in the first image set depicted in FIG. 7(a), a numerical value corresponding to the time taken to draw the first image set, or the like as the completeness of the first image set.

The image retrieval unit 103 in the present embodiment retrieves similar images using the first similarity, the second similarity, and the completeness of the first image set, derived in this manner. It should be noted that detailed processing for the retrieval of the similar images will be described later on using a flowchart and the like.

[Overall Operation]

Figure 8:
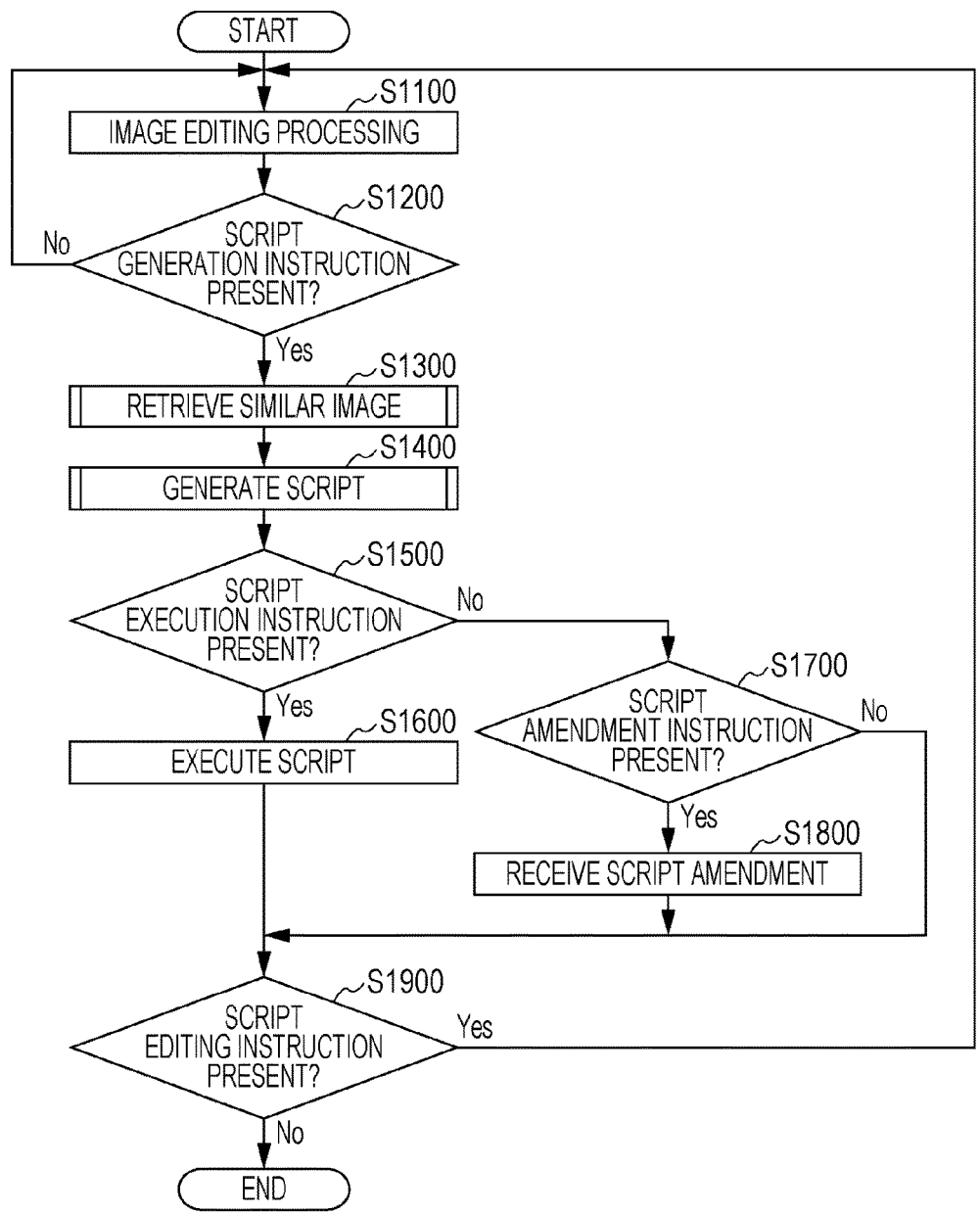
FIG. 8 is a flowchart depicting an example of an overall processing operation performed by the program generating device in the embodiment.

FIG. 8 is a flowchart depicting an example of an overall processing operation performed by the program generating device 100.

(Step S1100)

First, the program generating device 100 carries out editing processing for drawing or editing an image in the image input region 202 in accordance with an input operation by the user. For example, the program generating device 100 receives new partial images and amends partial images that have already been drawn.

(Step S1200)

Next, the program generating device 100 determines whether or not there is a script generation instruction from the terminal device 200. That is, the program generating device 100 determines whether or not the operation button S of the script generating screen 201 has been selected. Here, if it is determined that there is a script generation instruction (yes in step S1200), the program generating device 100 proceeds to the processing of step S1300. However, if it is determined that there is no script generation instruction (no in step S1200), the program generating device 100 returns to the processing of step S1100.

(Step S1300)

The program generating device 100, upon determining that there is a script generation instruction in step S1200, retrieves a similar image that is similar to the processing target image included in the first image set, from the database DB.

(Step S1400)

Next, the program generating device 100 generates an application script as a script to be applied to the processing target image, on the basis of the similar image retrieved by means of step S1300. The program generating device 100 then displays the application script in the script display editing region 203.

(Step S1500)

Here, the program generating device 100 determines whether or not there is a script execution instruction from the terminal device 200. Here, if it is determined that there is a script execution instruction (yes in step S1500), the program generating device 100 proceeds to the processing of step S1600. However, if it is determined that there is no script execution instruction (no in step S1500), the program generating device 100 proceeds to the processing of step S1700.

(Step S1600)

The program generating device 100, upon determining that there is an application script execution instruction in step S1500, executes the application script generated in step S1400. The program generating device 100 thereby changes the processing target image included in the first image set.

(Step S1700)

The program generating device 100, upon determining that there is no application script execution instruction in step S1500, additionally determines whether or not there is an amendment instruction for the application script generated in step S1400 from the terminal device 200. Here, if it is determined that there is an amendment instruction for the application script (yes in step S1700), the program generating device 100 proceeds to the processing of step S1800. However, if it is determined that there is no amendment instruction for the application script (no in step S1700), the program generating device 100 proceeds to the processing of step S1900.

(Step S1800)

The program generating device 100, upon determining that there is an amendment instruction for the application script in step S1700, amends the application script in accordance with an input operation of the user. The program generating device 100 then proceeds to the processing of step S1900.

(Step S1900)

The program generating device 100 determines whether or not there is an image editing instruction from the terminal device 200. That is, the program generating device 100 determines whether or not the operation button B1 or B2 of the script generating screen 201 has been selected. Here, if it is determined that there is an image editing instruction (yes in step S1900), the program generating device 100 returns to the processing of step S1100. However, if it is determined that there is no image editing instruction (no in step S1900), the program generating device 100 ends all processing relating to the generation of an application script.

The program generating device 100 in the present embodiment generates an aforementioned project by carrying out the processing of steps S1100 to S1900.

[Similar Image Retrieval]

Here, the retrieval of a similar image in step S1300 will be described in detail.

The image retrieval unit 103 in the present embodiment calculates the integrated similarity St by weighting and adding the first similarity Sp and the second similarity Sw. At such time, the image retrieval unit 103 uses the first weight α and the second weight β calculated by the weight calculation unit 105. That is, the image retrieval unit 103 calculates the integrated similarity St of an image included in the second image set with respect to the processing target image according to integrated similarity $St = \alpha \cdot Sp + \beta \cdot Sw$.

Figure 9:
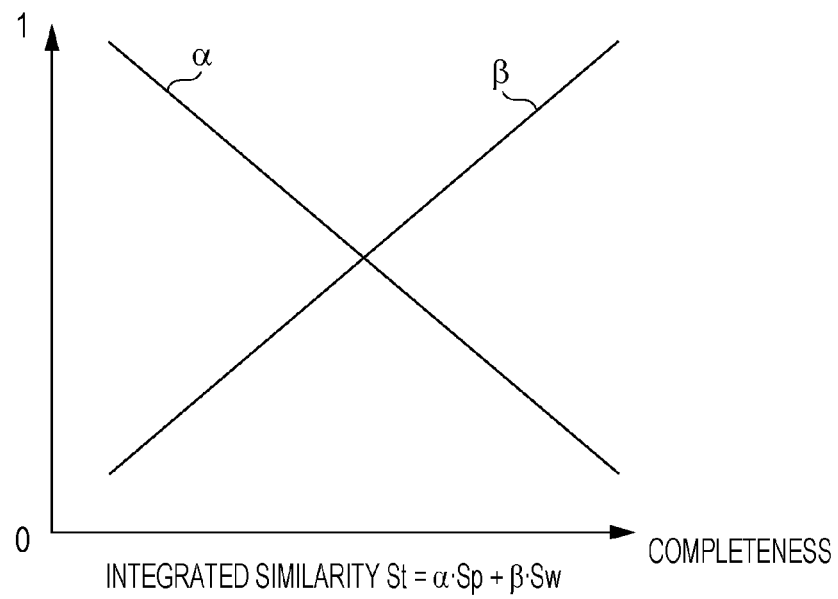
FIG. 9 is a drawing depicting a first weight and a second weight in the embodiment.

FIG. 9 depicts the first weight α and the second weight β.

The first weight α is a weight by which the first similarity Sp is multiplied, and is a value which is equal to or greater than 0 and equal to or less than 1 and which decreases as the completeness of the first image set increases. The second weight β is a weight by which the second similarity Sw is multiplied, and is a value which is equal to or greater than 0 and equal to or less than 1 and which increases as the completeness of the first image set increases. The image retrieval unit 103 in the present embodiment calculates the integrated similarity St by calculating the sum of the product of the first similarity Sp and the first weight α and the product of the second similarity Sw and the second weight β.

Thus, the first similarity Sp and the second similarity Sw can be appropriately weighted and added according to the completeness of the first image set. That is, in the case where the completeness is low, it is possible for there to be a similarity between the processing target image of the first image set and an image of the second image set even if the similarity between the first image set and the second image set is low. Conversely, in the case where the completeness is high, if the similarity between the first image set and the second image set is high, from a broad perspective, the processing target image of the first image set and an image of the second image set may be treated as being similar even if the similarity between those images is low.

Thus, in the present embodiment, if the completeness is low, the weight for the first similarity Sp is increased and the weight for the second similarity Sw is decreased, and conversely, if the completeness is high, the weight for the first similarity Sp is decreased and the weight for the second similarity Sw is increased. As a result, the reliability of the integrated similarity can be further increased, and a script that is more suitable for the processing target image can be generated.

Figure 10:
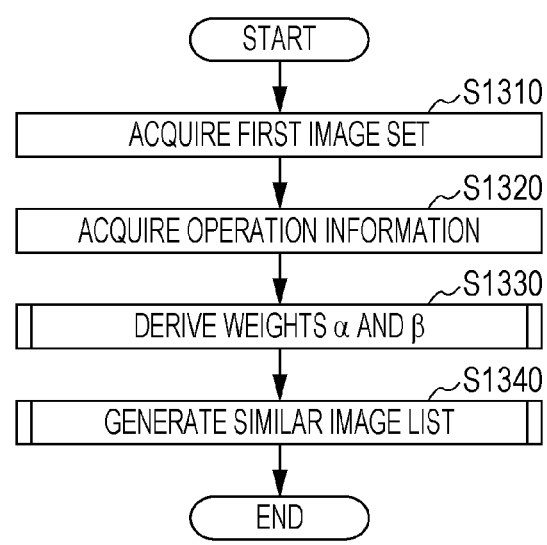
FIG. 10 is a flowchart depicting an example of a detailed processing operation in the retrieval of a similar image in step S1300 depicted in FIG. 8.

FIG. 10 is a flowchart depicting an example of a detailed processing operation in the retrieval of a similar image in step S1300 depicted in FIG. 8.

(S1310)

The image retrieval unit 103 acquires a first image set from the terminal device 200 via the acquisition unit 102.

(S1320)

The weight calculation unit 105 acquires operation information from the terminal device 200 via the acquisition unit 102.

(S1330)

The weight calculation unit 105 derives the first weight α and the second weight β on the basis of the acquired operation information.

(S1340)

The image retrieval unit 103 generates a similar image list that indicates one or more similar images, using the first image set acquired in step S1310 and the first weight α and the second weight β derived in step S1330. One or more similar images are retrieved by generating this similar image list.

Figure 11:
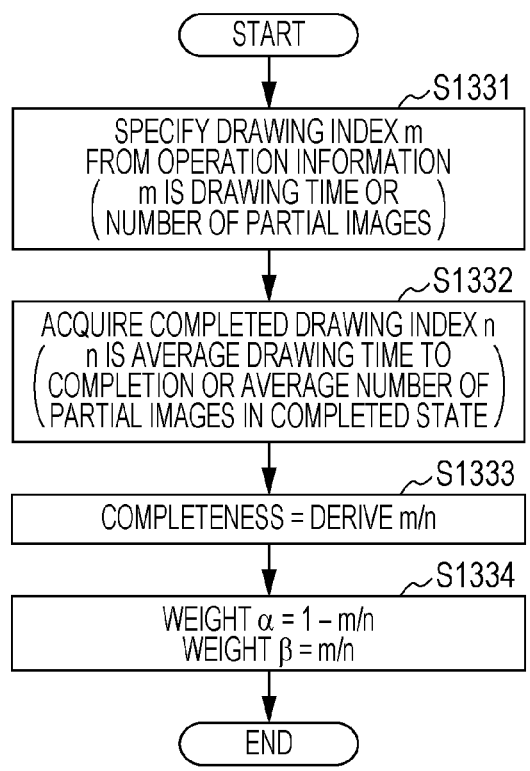
FIG. 11 is a flowchart depicting an example of a detailed processing operation in the deriving of the weights in step S1330 depicted in FIG. 10.

FIG. 11 is a flowchart depicting an example of a detailed processing operation in the deriving of the weights in step S1330 depicted in FIG. 10.

(S1331)

The weight calculation unit 105 specifies a drawing index m from the operation information acquired via the acquisition unit 102 from the terminal device 200. The drawing index m, for example, is the drawing time for the first image set, in other words, the elapsed time from the drawing of the first image set having been started. For example, the content of input operations and the time and date on which those input operations were carried out are indicated in the operation information. Consequently, the weight calculation unit 105 derives the time and date on which the first input operation for the first image set was carried out from the operation information therefor, and specifies the elapsed time from the aforementioned time and date to the present time and date as the drawing index m. Alternatively, the drawing index m is the number of partial images included in the first image set. It should be noted that, in the case where the drawing index m is the number of partial images, the weight calculation unit 105 may specify the drawing index m from the first image set rather than the operation information.

(S1332)

The weight calculation unit 105 acquires a completed drawing index n. This completed drawing index n is the average drawing time to completion of an image set, in other words, is the average time from the start of the drawing of an image set to completion. Alternatively, the completed drawing index n is the average partial image number in a completed image set, in other words, the average number of partial images included in a completed image set. The weight calculation unit 105 may acquire the completed drawing index n from the database DB, for example, or may acquire the completed drawing index n from another recording medium other than the database DB.

(S1333)

The weight calculation unit 105 uses the drawing index m and the completed drawing index n to derive a completeness indicated by m/n. That is, the completeness is the ratio of the drawing time for the first image set with respect to the average drawing time to completion of an image set. If the average drawing time is n minutes and the drawing time for the first image set is m minutes, the completeness is m minutes/n minutes. Alternatively, the completeness is the ratio of the partial image number of the first image set with respect to the average partial image number of a completed image set. If the average partial image number is n images and the partial image number of the first image set is m images, the completeness is m images/n images.

In this way, in the present embodiment, the completeness is the ratio of the elapsed time from the start of the drawing of the first image set with respect to a reference time, or the ratio of the number of images (in other words, partial images) included in the first image set with respect to a reference number. The reference time is the aforementioned average drawing time, and the reference number is the aforementioned average partial image number. It should be noted that the average drawing time may be the average time for each user, or may be the average time for people. Similarly, the average partial image number may be the average number of partial images for each user, or may be the average number of partial images for people.

(S1334)

The weight calculation unit 105 respectively calculates the first weight α and the second weight β according to α=1−m/n and β=m/n. In this way, the first weight α in the present embodiment is a value that decreases as the completeness increases, and the second weight β is a value that increases as the completeness increases.

Figure 12:
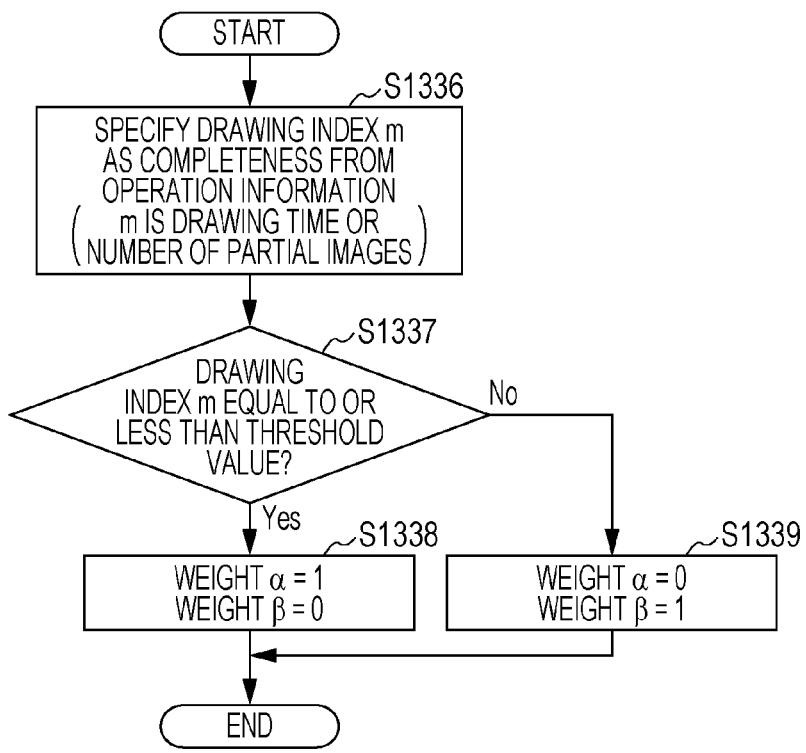
FIG. 12 is a flowchart depicting another example of a detailed processing operation in the deriving of the weights in step S1330 depicted in FIG. 10.

FIG. 12 is a flowchart depicting another example of a detailed processing operation in the deriving of the weights in step S1330 depicted in FIG. 10.

(S1336)

The weight calculation unit 105 specifies a drawing index m as the completeness from operation information acquired via the acquisition unit 102 from the terminal device 200. Similar to that mentioned above, the drawing index m is the drawing time for the first image set or is the number of partial images included in the first image set. It should be noted that, in the case where the drawing index m is the number of partial images, the weight calculation unit 105 may specify the drawing index m from the first image set rather than the operation information.

(S1337)

The weight calculation unit 105 determines whether or not the drawing index m is equal to or less than the threshold value (step S1337). Here, if it is determined that the drawing index m is equal to or less than the threshold value (yes in step S1337), the weight calculation unit 105 proceeds to the processing of step S1338. However, if it is determined that the drawing index m exceeds the threshold value (no in step S1337), the weight calculation unit 105 proceeds to the processing of step S1339.

(S1338)

Since the drawing index m is small, in other words, the completeness is low, the weight calculation unit 105 respectively derives the first weight α and the second weight β as α=1 and β=0.

(S1339)

Since the drawing index m is large, in other words, the completeness is high, the weight calculation unit 105 respectively derives the first weight α and the second weight β as α=0 and β=1.

In this way, in the present embodiment, the first weight α and the second weight β may be represented by binary values. That is, when the completeness is equal to or less than a second threshold value, the first weight α is 1 and the second weight β is 0, and when the completeness exceeds the second threshold value, the first weight α is 0 and the second weight β is 1. Thus, since the first weight α and the second weight β are represented by binary values of 0 or 1, the processing load for calculating the integrated similarity St can be reduced.

It should be noted that, although the drawing index m is used as the completeness in the example depicted in FIG. 12, similar to the example depicted in FIG. 11, m/n may be used as the completeness, and the first weight α and the second weight β may be represented as binary values in accordance with the magnitude of that completeness.

Figure 13:
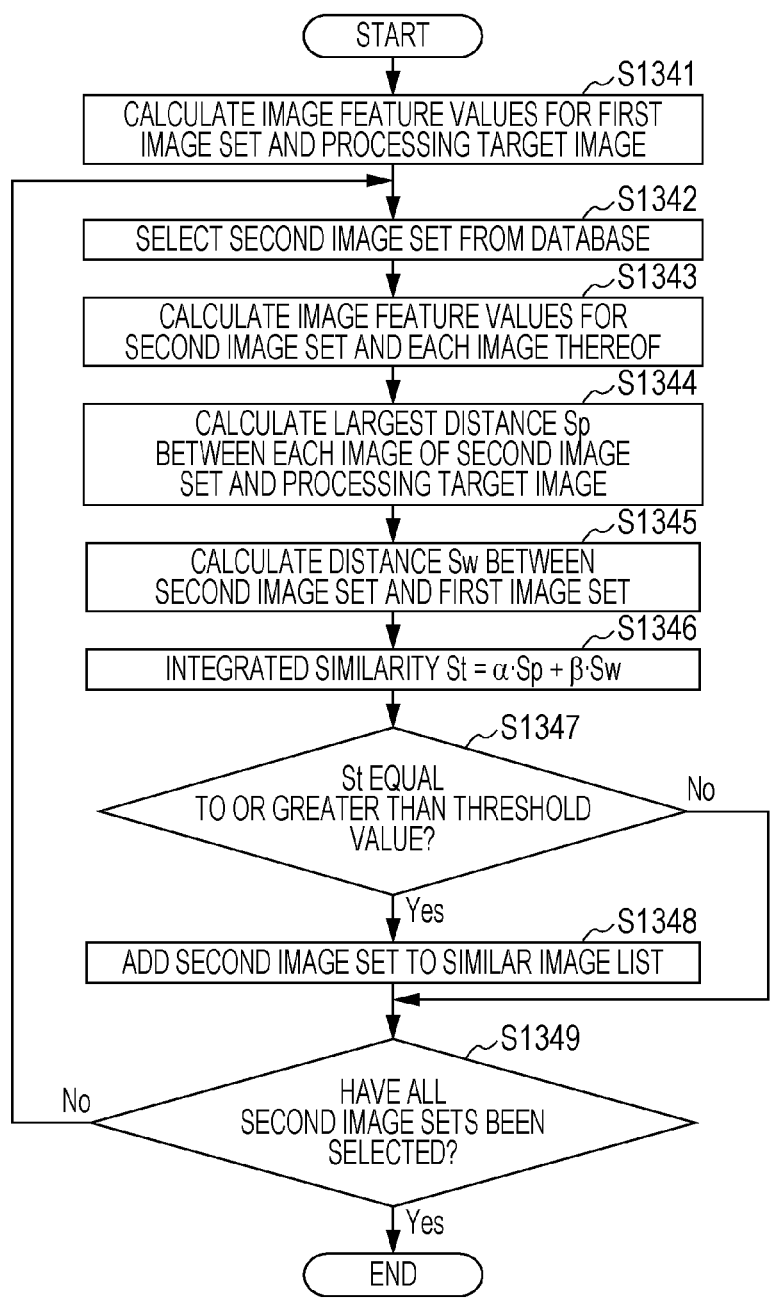
FIG. 13 is a flowchart depicting an example of a detailed processing operation in the generation of a similar image list in step S1340 depicted in FIG. 10.

FIG. 13 is a flowchart depicting an example of a detailed processing operation in the generation of a similar image list in step S1340 depicted in FIG. 10.

(S1341)

The image retrieval unit 103 calculates an image feature value for the entire first image set, and an image feature value for the processing target image included in the first image set. These image feature values are calculated as vectors by means of the scale-invariant feature transform (SIFT), speeded up robust features (SURF), or the like.

(S1342)

The image retrieval unit 103 selects a second image set from the database DB.

(S1343)

Similar to step S1341, the image retrieval unit 103 calculates an image feature value for the entire second image set selected, and an image feature value for each image included in the second image set.

(S1344)

The image retrieval unit 103 calculates each distance (in other words, an inter-image distance) between the vectors representing the feature values of each image included in the second image set, and the vector representing the feature value of the processing target image. This inter-image distance is a cosine distance, for example. The image retrieval unit 103 selects the largest inter-image distance from among the calculated inter-image distances. This largest inter-image distance is equivalent to the aforementioned largest inter-image similarity, in other words, the first similarity Sp. It should be noted that the image included in the second image set having the largest calculated inter-image distance is hereinafter referred to as the most similar partial image.

(S1345)

The image retrieval unit 103 calculates the distance between the second image set and the first image set (in other words, an inter-set distance). This inter-set distance is the distance between a vector constituting the image feature value for the entire second image set, and a vector constituting the image feature value for the entire first image set, and, similar to that mentioned above, is a cosine distance, for example. Furthermore, this inter-set distance is equivalent to the aforementioned inter-set similarity, in other words, the second similarity Sw.

(S1346)

The image retrieval unit 103 calculates the integrated similarity St of the most similar partial image of the second image set with respect to the processing target image. At such time, the image retrieval unit 103 uses the first similarity Sp and the second similarity Sw calculated in steps S1344 and S1345, and the first weight α and the second weight β calculated in step S1330. That is, the image retrieval unit 103 calculates the integrated similarity St according to St=α·Sp+β·Sw.

(S1347)

The image retrieval unit 103 determines whether or not the integrated similarity St is equal to or greater than a threshold value. Here, if it is determined that the integrated similarity St is equal to or greater than the threshold value (yes in step S1347), the image retrieval unit 103 proceeds to the processing of step S1348. However, if it is determined that the integrated similarity St is less than the threshold value (no in step S1347), the image retrieval unit 103 proceeds to the processing of step S1349.

(S1348)

In the case where the integrated similarity St is equal to or greater than the threshold value, the image retrieval unit 103 adds the second image set having that integrated similarity St to the similar image list. Specifically, the image retrieval unit 103 adds the project ID corresponding to the second image set, the integrated similarity St, the image ID of the most similar partial image having that integrated similarity St, and the like to the similar image list. It should be noted that, in the case where the integrated similarity St is less than the threshold value, the image retrieval unit 103 does not add the second image set having that integrated similarity St or the like to the similar image list. It should be noted that the image retrieval unit 103 may retain the similar image list.

That is, in the present embodiment, an image having a calculated integrated similarity St that is equal to or greater than the first threshold value, in other words, the most similar partial image, in each of the N number of second image sets stored in the database DB, is retrieved as a similar image.

(S1349)

The image retrieval unit 103 determines whether or not all of the second image sets in the database DB have been selected. Here, if it is determined that all of the second image sets have been selected (yes in step S1349), the image retrieval unit 103 ends the retrieval of similar images. However, if it is determined that all of the second image sets have not been selected (no in step S1349), the image retrieval unit 103 returns to the processing of step S1342. At such time, in step S1342, a second image set that has not yet been selected is selected from the database DB.

FIG. 14 depicts an example of the similar image list.

As is depicted in FIG. 14, the similar image list indicates second image sets having a calculated integrated similarity St that is equal to or greater than the threshold value. It should be noted that the second image sets are represented by the project IDs corresponding to the second image set thereof.

Specifically, the similar image list indicates not only the project ID but also the second similarity Sw, one or more image IDs, the image ID of the most similar partial image from among those image IDs, and the integrated similarity St in association with the project ID therefor.

The second similarity Sw is the aforementioned inter-set similarity or the inter-set distance calculated with respect to the second image set of the associated project ID. The one or more image IDs are the image IDs of all of the images in the second image set of the associated project ID. The image ID of the most similar partial image is the image ID of one image from among all of those images. The integrated similarity St is the similarity calculated with respect to the most similar partial image.

For example, the image retrieval unit 103, if having determined in step S1347 of FIG. 13 that the integrated similarity St is equal to or greater than the threshold value, adds that integrated similarity St and the image ID of the most similar partial image having that calculated integrated similarity St to the similar image list. For example, if the integrated similarity St is "0.90" as is depicted in FIG. 14, the image retrieval unit 103 adds that integrated similarity St "0.90" and the image ID "I_m_P5_1" of the most similar partial image having that calculated integrated similarity St to the similar image list.

In addition, the image retrieval unit 103 adds the project ID of the second image set that includes that most similar partial image, the second similarity Sw calculated with respect to that second image set, and the image IDs of each image included in that second image set to the similar image list. For example, in the case where the image ID of the most similar partial image is "I_m_P5_1", the image retrieval unit 103 adds the project ID "m_P5" of the second image set that includes that most similar partial image to the similar image list. In addition, the image retrieval unit 103 adds the image IDs "I_m_P5_1, I_m_P5_2, . . . " of each image included in that second image set to the similar image list.

A similar image list such as this indicates one or more similar images that are similar to the processing target image included in the first image set, as the most similar partial images (specifically, the image IDs of the most similar partial images).

Figure 15:
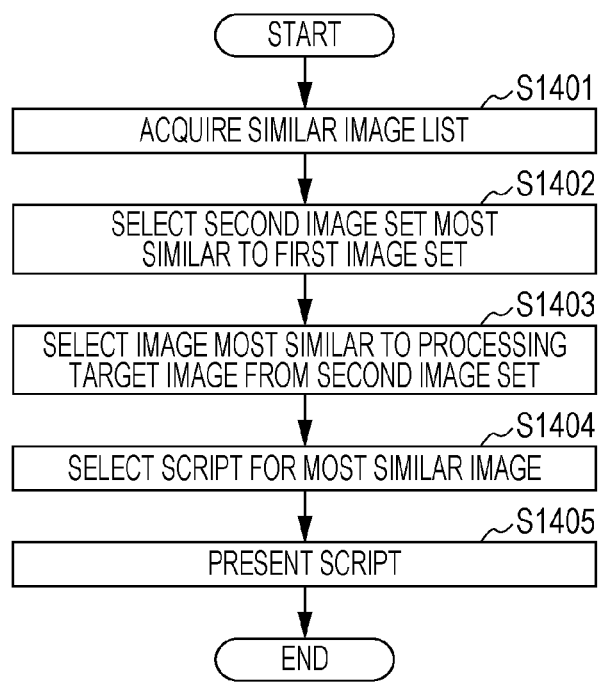
FIG. 15 is a flowchart depicting an example of a detailed processing operation in the generation of a script in step S1400 depicted in FIG. 8.

FIG. 15 is a flowchart depicting an example of a detailed processing operation in the generation of a script in step S1400 depicted in FIG. 8.

(S1401)

The script selection unit 104 acquires the similar image list from the image retrieval unit 103.

(S1402)

The script selection unit 104 refers to the similar image list and selects the second image set that is the most similar to the first image set. That is, the script selection unit 104 specifies the project ID associated with the largest second similarity Sw indicated in the similar image list, by referring to the similar image list. Thus, the second image set indicated by the specified project ID is selected.

(S1403)

The script selection unit 104 selects the image that is the most similar to the processing target image included in the first image set, from the second image set selected in step S1402. That is, the script selection unit 104 specifies the image ID of the most similar partial image associated with the project ID of the selected second image set, by referring to the similar image list. Thus, the image that is the most similar to the processing target image is selected.

(S1404)

The script selection unit 104 selects, from the database DB, the script associated with the image ID of the image selected in step S1403, in other words, the most similar partial image. Due to the script being selected in this way, that script is generated as an application script. The script selection unit 104 then outputs that application script to the display control unit 107.

(S1405)

The display control unit 107 acquires the application script from the script selection unit 104, and displays the application script on the display 200*d* of the terminal device 200. That is, the application script is displayed in the script display editing region 203 of the script generating screen 201.

In this way, in the present embodiment, M (N>M≥1) number of second image sets respectively including similar images (in other words, most similar partial images) are specified from N number of second image sets stored in the database DB, by acquiring the similar image list in step S1401. Then, in step S1402, the second image set having the largest calculated second similarity Sw is selected from the M number of second image sets. Next, in step S1403, the similar image (in other words, the most similar partial image) constituting the image that is the most similar with the processing target image is specified from the selected second image set. Then, in step S1404, the script associated with the specified similar image in the database DB is selected, and an application script is thereby generated.

Thus, the one or more similar images (in other words, most similar partial images) retrieved in step S1300 can be appropriately narrowed down to one image. Consequently, a script that is suitable for the processing target image can be easily generated.

Figure 21:
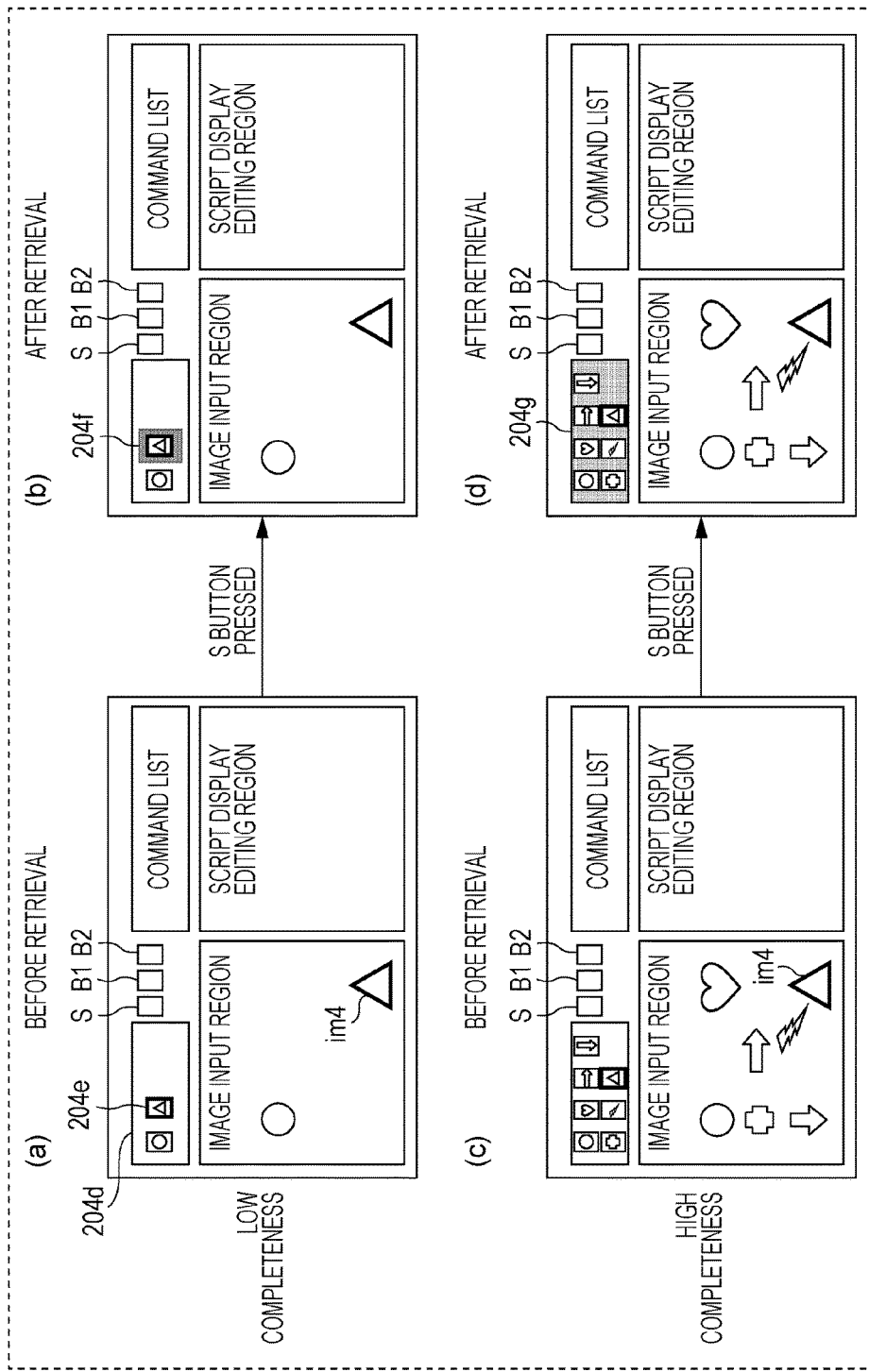
FIG. 21 is a drawing depicting an example of a screen displayed on the display of the terminal device in the embodiment.

FIG. 21 depicts an example of a transition from a screen of the display 200*d* that is displayed before the retrieval of a similar image, to a screen of the display 200*d* that is displayed after the retrieval of a similar image. Retrieval here means the retrieval of a similar image (S1300) in FIG. 8. FIGS. 21(*a*) and (*b*) are examples of screens in the case where the completeness is low. Specifically, FIG. 21(*a*) is an example of a screen that is displayed before retrieval, and FIG. 21(*b*) is an example of a screen that is displayed after the retrieval of a similar image. FIGS. 21(*c*) and (*d*) are examples of screens in the case where the completeness is high. FIG. 21(*c*) is an example of a screen that is displayed before the retrieval of a similar image, and FIG. 21(*d*) is an example of a screen that is displayed after the retrieval of a similar image. FIG. 21(*a*) to (*d*) are similar to the script generating screen 201 depicted in FIG. 2.

The display control unit 107 displays information relating to the completeness used when a similar image is retrieved, on the script generating screen 201, on the basis of the completeness used when the image retrieval unit 103 retrieved the similar image. It should be noted that the display control unit 107 may display the information relating to the completeness, on the screen of the display 200*d*, after S1300 depicted in FIG. 8.

FIGS. 21(*a*) and (*c*) depict states from before the retrieval of a similar image with respect to an input image im4. In the case where the completeness is low as is depicted in FIG. 21(*b*), the display control unit 107 displays a selected image 204*e* in such a way as to be surrounded by a background 204*f* in order to emphasize the selected image 204*e* in an image selection region 204*d*. The background 204*f* mentioned here includes a display in which a different color from that of the periphery of the image selection region 204*d* is used, a display in which a color that stands out within the script generating screen 201 is used (for example, a primary color or a color that is not used within the script generating screen 201), a display in which the thickness of a line surrounding the periphery is greater than the thickness of lines surrounding other regions, a display in which a color that stands out is used for the color of the line surrounding the periphery, or a display that flashes, which means a display in which the selected image 204e is emphasized compared to the display used in FIG. 21(a). A display is thereby implemented in which the weight of the selected image is increased for it to be visually clear that a similar image has been retrieved.

In the case where the completeness is high as is depicted in FIG. 21(d), the display control unit 107 displays the entire image selection region 204d in such a way as to be surrounded by a background 204g. The background 204g mentioned here includes a display in which a different color from that of the periphery of the image selection region 204d is used, a display in which a color that stands out within the script generating screen 201 is used (for example, a primary color or a color that is not used within the script generating screen 201), a display in which the thickness of a line surrounding the periphery is greater than the thickness of lines surrounding other regions, a display in which a color that stands out is used for the color of the line surrounding the periphery, or a display that flashes, which means a display in which the entire image selection region 204d is emphasized compared to the display used in FIG. 21(c). A display is thereby implemented in which the weight of all images displayed in the image selection region 204d is increased for it to be visually clear that similar images have been retrieved.

That is, a display is implemented in such a way that the weight for when a similar image has been retrieved is visually clear to the user, due to the screen for after retrieval being displayed in a different manner according to the completeness, even in the case where retrieval is performed with respect to the same image (the input image im4). In this way, by changing the screen display for after the retrieval of a similar image, in accordance with the completeness, images are weighted and the user is able to easily understand for which images a similar image has been retrieved.

Figure 22:
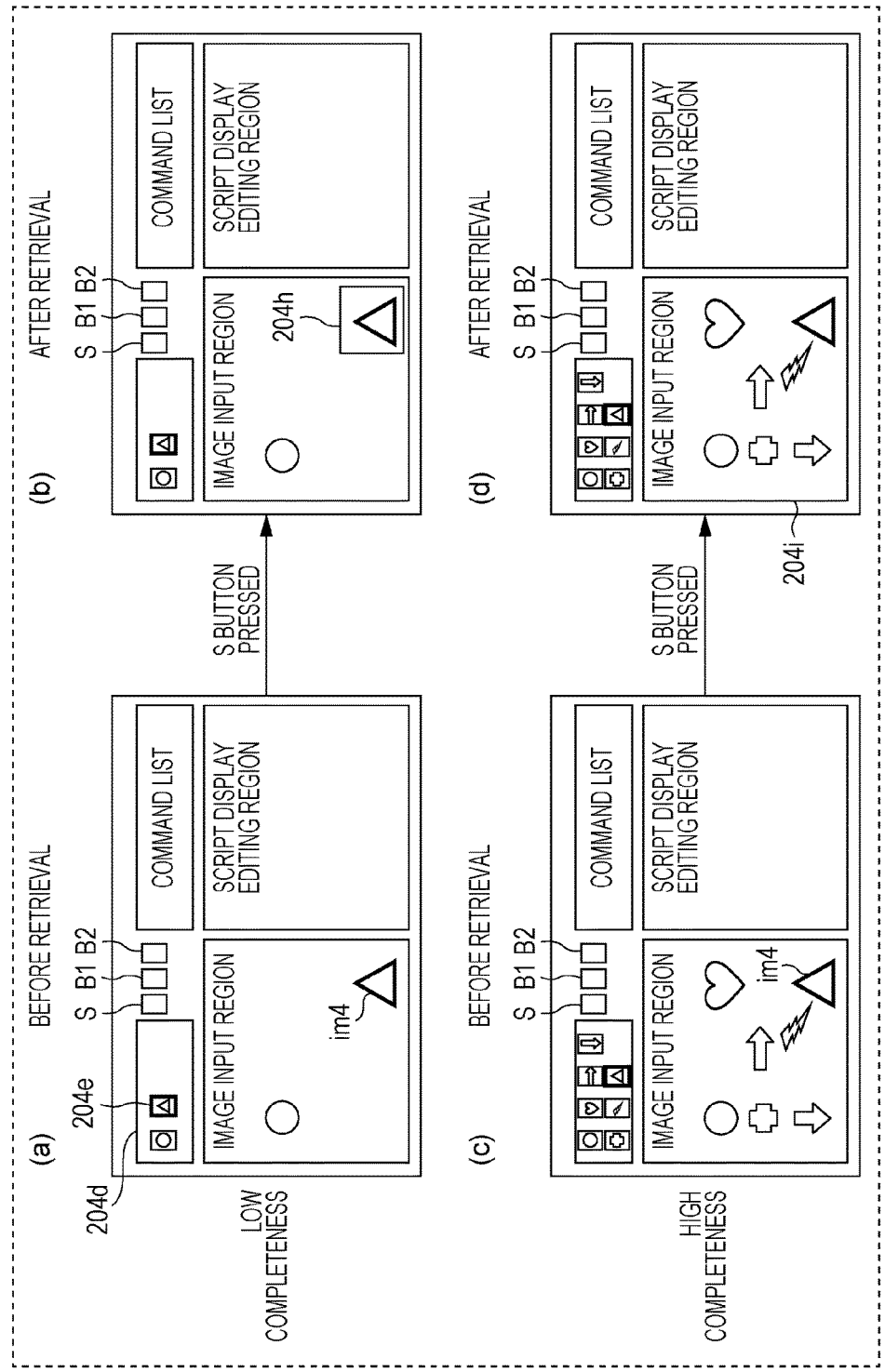
FIG. 22 is a drawing depicting an example of a screen displayed on the display of the terminal device in the embodiment.

Furthermore, FIG. 22 depicts another example of a transition from a screen of the display 200d that is displayed before the retrieval of a similar image, to a screen of the display 200d that is displayed after the retrieval of a similar image. FIGS. 22(a) and (b) are examples of screens in the case where the completeness is low. Specifically, FIG. 22(a) is an example of a screen that displayed before retrieval, and FIG. 22(b) is an example of a screen that is displayed after the retrieval of a similar image. FIGS. 22(c) and (d) are examples of screens in the case where the completeness is high. FIG. 22(c) is an example of a screen that is displayed before the retrieval of a similar image, FIG. 22(d) is an example of a screen that is displayed after the retrieval of a similar image. FIG. 22(a) to (d) are similar to the script generating screen 201 depicted in FIG. 2. FIG. 22 is different from FIG. 21 in that the method for visually displaying the weight for when a similar image has been retrieved is different. Specifically, in contrast to images being emphasized in the image selection region 204d in FIG. 21, in FIG. 22, images are emphasized in the image input region 202.

FIG. 22(b), a background 204h is displayed in the image input region 202, corresponding to the background 204f in FIG. 21(b). In FIG. 22(d), a background 204i is displayed in the image input region 202, corresponding to the background 204g in FIG. 21(d).

The background 204h and the background 204i include a display in which a different color from that of the periphery of the image input region 202 is used, a display in which a color that stands out within the script generating screen 201 is used (for example, a primary color or a color that is not used within the script generating screen 201), a display in which the thickness of a line surrounding the periphery is greater than the thickness of lines surrounding other regions, a display in which a color that stands out is used for the color of the line surrounding the periphery, or a display that flashes.

As mentioned above, in the program generating device 100 in the present embodiment, an integrated similarity St that is based on the first similarity Sp, the second similarity Sw, and the completeness of the first image set is calculated, and a similar image is retrieved using the integrated similarity St. Consequently, appropriate similar images can be retrieved with respect to the processing target image. As a result, a script that is more suitable for the processing target image can be generated.

(Modified Example)

Figure 16:
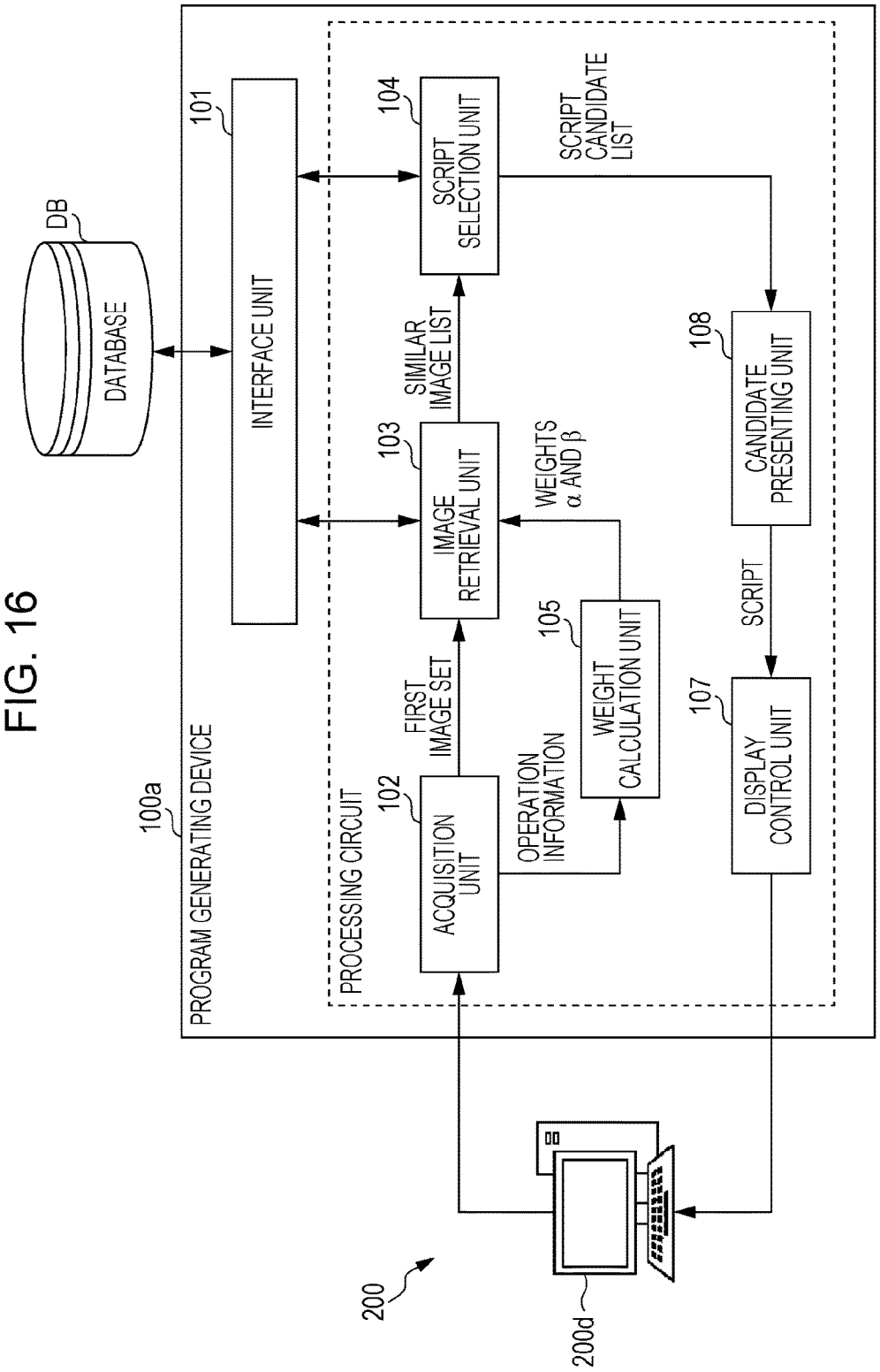
FIG. 16 is a block diagram depicting a configuration of a program generating device according to a modified example of the embodiment.

In the aforementioned embodiment, one script is selected with respect to a processing target image of the first image set, and that script is presented as an application script. In the present modified example, scripts are selected as candidate scripts, and one candidate script, which is selected by the user from the candidate scripts, is presented as an application script, FIG. 16 is a block diagram depicting a configuration of a program generating device according to the modified example of the aforementioned embodiment.

A program generating device 100a according to the present modified example additionally includes a candidate presenting unit 108 together with including the same constituent elements as the program generating device 100 in the aforementioned embodiment. That is, the program generating device 100a according to the present modified example includes the interface unit 101, the acquisition unit 102, the image retrieval unit 103, the script selection unit 104, the weight calculation unit 105, the display control unit 107, and the candidate presenting unit 108. It should be noted that, similar to the program generating device 100 in the aforementioned embodiment, from among the aforementioned constituent elements provided in the program generating device 100a, each constituent element excluding the interface unit 101 is provided in a processing circuit.

The program generating device 100a according to the present modified example carries out the processing operation depicted by the flowchart of FIG. 8; however, in step S1400 in which a script is generated, a processing operation that is different from the processing operation depicted by the flowchart of FIG. 15 is carried out.

Figure 17:
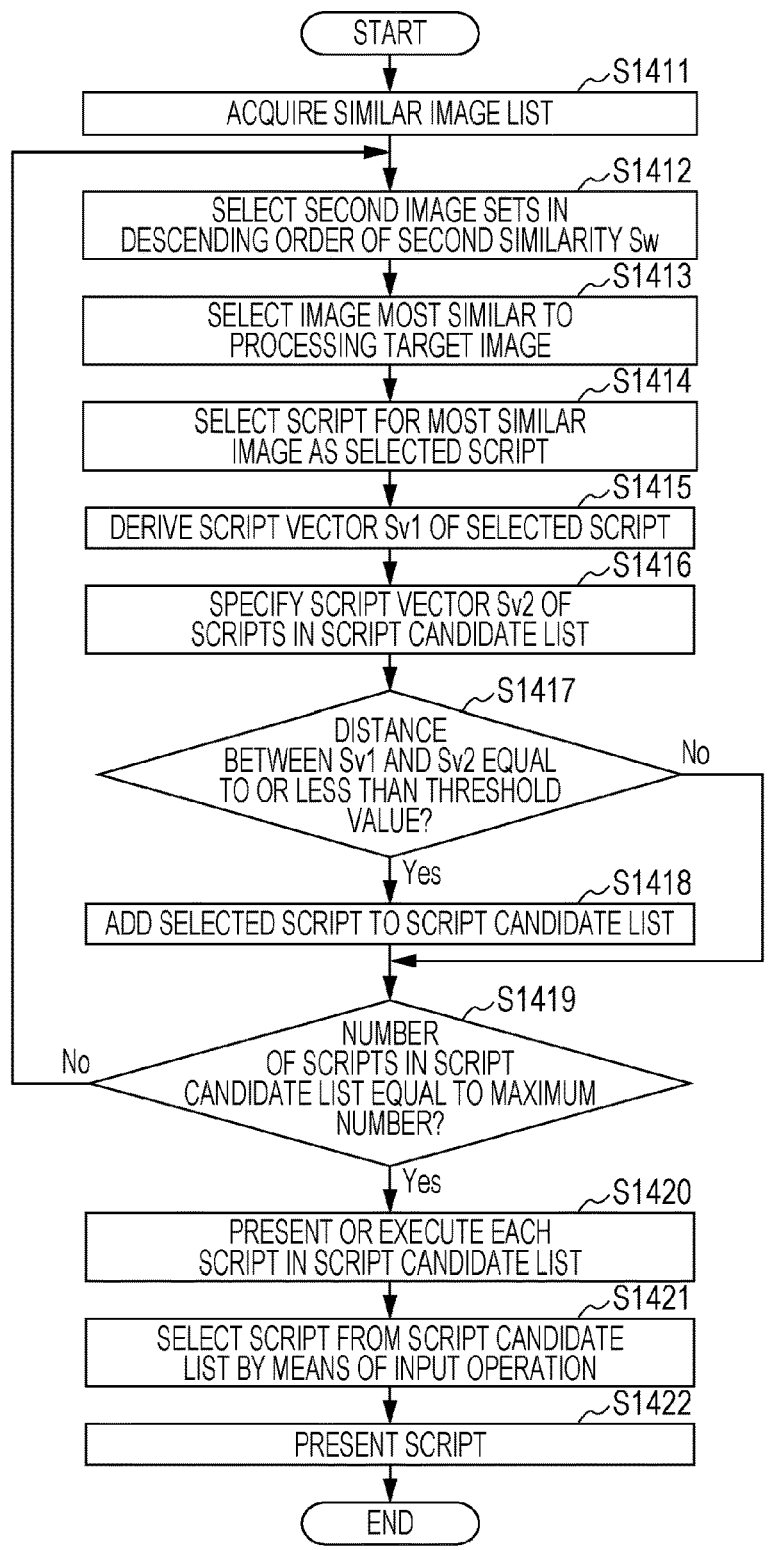
FIG. 17 is a flowchart depicting an example of a detailed processing operation in the generation of a script in step S1400 depicted in FIG. 8.

FIG. 17 is a flowchart depicting an example of a detailed processing operation in the generation of a script in step S1400 depicted in FIG. 8.

(S1411)

The script selection unit 104 acquires the similar image list from the image retrieval unit 103.

(S1412)

The script selection unit 104 refers to the similar image list, and selects second image sets in descending order of the second similarity Sw. That is, the script selection unit 104 selects the project ID associated with the largest second similarity Sw from among the project IDs of one or more second image sets that have not yet been selected, indicated in the similar image list. By selecting this project ID, the second image set corresponding to that project ID is selected.

(S1413)

The script selection unit 104 selects the image that is the most similar to the processing target image included in the first image set, from among one or more images included in the second image set selected in step S1412. That is, the script selection unit 104 refers to the similar image list and selects the image ID of the most similar partial image associated with the project ID of the selected second image set. By selecting this image ID, the image that is the most similar to the processing target image is selected.

(S1414)

The script selection unit 104 selects, from the database DB as a selected script, the script associated with the image ID of the image selected in step S1413 (in other words, the most similar partial image).

(S1415)

The script selection unit 104 derives a script vector Sv1 of the selected script.

(S1416)

The script selection unit 104 specifies a script vector Sv2 of each script indicated in a script candidate list. The details of the script candidate list will be described later on.

(S1417)

The script selection unit 104 determines whether or not the distance between the script vector Sv1 derived in step S1415 and each script vector Sv2 specified in step S1416, for example, the cosine distance, is equal to or less than a threshold value. Here, if it is determined that the distance is equal to or less than the threshold value (yes in step S1417), the script selection unit 104 proceeds to the processing of step S1418. It should be noted that the script selection unit 104 proceeds to the processing of step S1418 also in the case where there are no scripts indicated in the script candidate list and it cannot be determined whether or not the distance is equal to or less than the threshold value. However, if it is determined that the distance exceeds the threshold value (no in step S1417), the script selection unit 104 proceeds to the processing of step S1419.

(S1418)

The script selection unit 104 adds the selected script to the script candidate list. That is, a script having a script vector Sv1 with which there is a long distance with the script vector Sv2 of each script indicated in the script candidate list is newly added to the script candidate list. To paraphrase, a script having a script vector Sv1 that is not similar to any script vector Sv2 indicated in the script candidate list is added to the script candidate list. Specifically, the script ID of the selected script is added to the script candidate list.

(S1419)

The script selection unit 104 determines whether or not the number of scripts indicated in the script candidate list has reached a maximum number. The maximum number is a number that is predetermined with respect to the script candidate list. Here, if it is determined that the number of scripts has reached the maximum number (yes in step S1419), the script selection unit 104 proceeds to the processing of step S1420. However, if it is determined that the number of scripts is less than the maximum number (no in step S1419), the script selection unit 104 returns to the processing from step S1412.

(S1420)

The candidate presenting unit 108 acquires the script candidate list indicating only the maximum number of scripts, from the script selection unit 104. The candidate presenting unit 108 then displays each script indicated in the script candidate list on the display 200d of the terminal device 200 via the display control unit 107. Alternatively, the candidate presenting unit 108 causes the display control unit 107 to sequentially execute each of those scripts. Specifically, the candidate presenting unit 108 acquires the scripts having each script ID indicated in the script candidate list, from the database DB via the script selection unit 104. The candidate presenting unit 108 then causes the display control unit 107 to present or execute those acquired scripts. Thus, those scripts are presented or executed as candidate scripts.

(S1421)

When each candidate script is presented or executed in step S1420, the user selects any of the candidate scripts by means of an input operation with respect to the terminal device 200. The candidate presenting unit 108 acquires information (for example, the script ID) indicating the selected candidate script via the acquisition unit 102, for example. The candidate presenting unit 108 thereby selects one script corresponding to the input operation from among the scripts indicated in the script candidate list.

(S1422)

The candidate presenting unit 108 notifies the one script selected in step S1421 to the display control unit 107 as an application script. In other words, the script ID of the application script is notified to the display control unit 107. The display control unit 107 displays the application script having that script ID on the display 200d of the terminal device 200. That is, the application script is displayed in the script display editing region 203 of the script generating screen 201.

Here, the script candidate list will be described in detail using FIG. 18.

Figure 18:
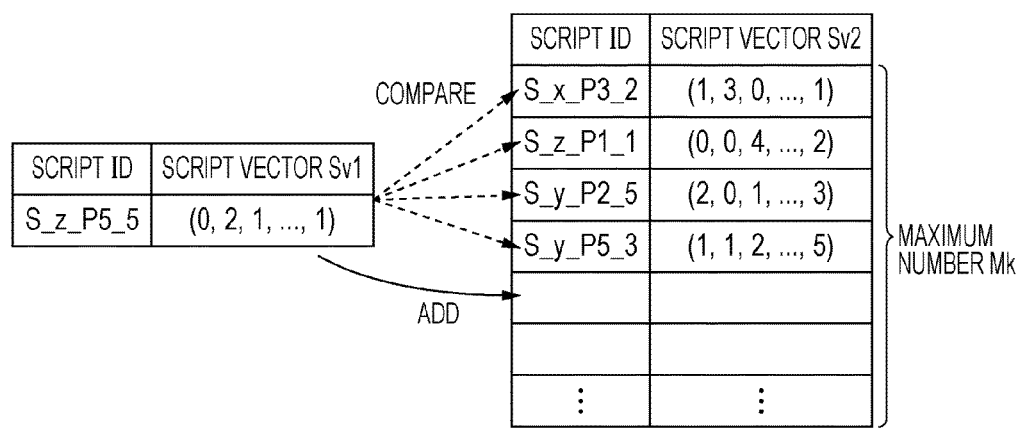
FIG. 18 is a drawing depicting processing for adding a selected script to a script candidate list, in the embodiment.

FIG. 18 depicts processing for adding a selected script to the script candidate list.

The script candidate list is able to indicate scripts of the maximum number Mk or less, for example. Specifically, the script candidate list indicates the script IDs and script vectors Sv2 of scripts. In the example depicted in FIG. 18, the script candidate list indicates the scripts IDs and script vectors Sv2 of each of four scripts.

The candidate presenting unit 108 derives the script vector Sv1 (0, 2, 1, . . . , 1) with respect to a selected script indicated by the script ID "S_z_P5_5" in step S1415 depicted in FIG. 17, for example. The script vector is a Q-dimensional vector (Q being an integer that is equal to or greater than 1), for example, and the value of each element included in the script vector indicates the frequency of the appearance of the type of command corresponding to that element, or the term frequency-inverse document frequency (tf-idf) of that command. The command is an instruction that changes an image, and the types of such changes include causing an image to move, rotate, rebound, walk, or the like.

Next, the candidate presenting unit 108 specifies the script vectors Sv2 of each script indicated in the script candidate list. For example, the candidate presenting unit 108 specifies the four script vectors Sv2 (1, 3, 0, . . . , 1), (0, 0, 4, . . . , 2), (2, 0, 1, . . . , 3), and (1, 1, 2, . . . , 5) indicated in the script candidate list. The candidate presenting unit 108 then calculates the distance between the script vector Sv1 (0, 2, 1, . . . , 1) and each of the four script vectors Sv2 (1, 3, 0, 1), (0, 0, 4, . . . , 2), (2, 0, 1, . . . , 3), and (1, 1, 2, . . . , 5).

Next, the candidate presenting unit 108, if having determined that any of the calculated distances is equal to or less than a threshold value, adds the script vector Sv1 of the selected script (0, 2, 1, . . . , 1) and the script ID "S_z_P5_5" of the selected script to the script candidate list. At such time, the script vector Sv1 is added as a new script vector Sv2.

Figure 19:
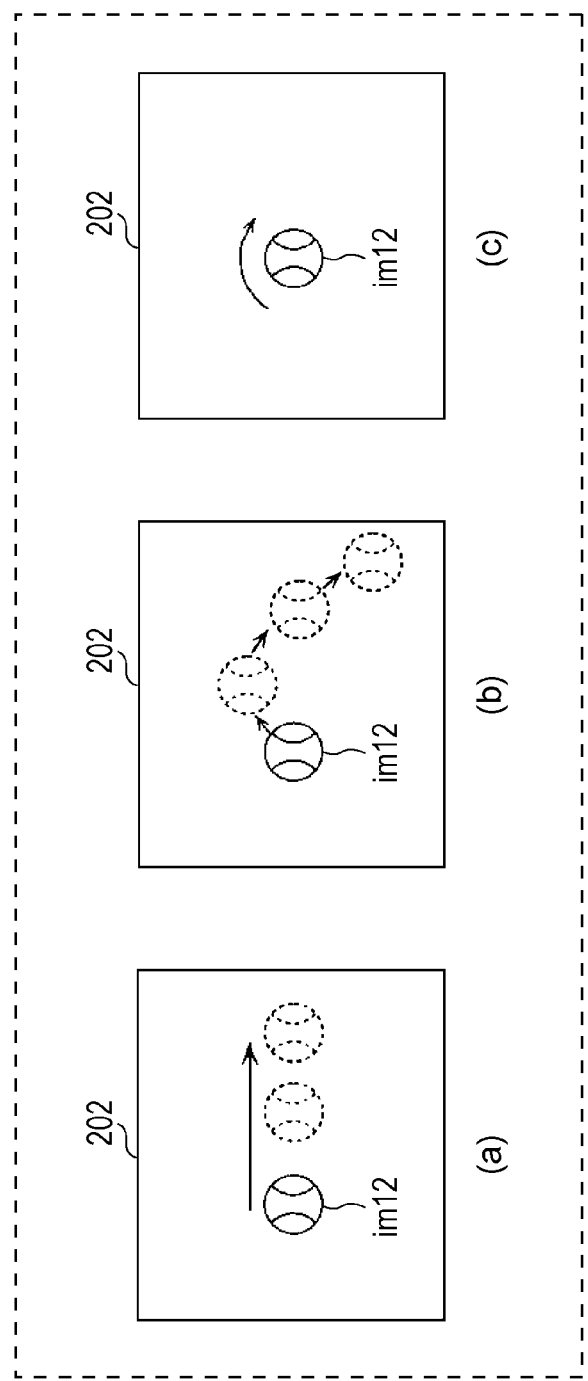
FIG. 19 depicts an example of a state in which each candidate script indicated in the script candidate list is executed, in the embodiment.

FIG. 19 depicts an example of a state in which each candidate script indicated in the script candidate list is executed.

The display control unit 107, in step S1420 of FIG. 17, sequentially executes each candidate script indicated in the script candidate list, in accordance with an instruction from the candidate presenting unit 108. For example, as is depicted in FIG. 19(a), the display control unit 107 executes a first candidate script with respect to the processing target image im12 displayed in the image input region 202. Thus, the processing target image im12 moves to the right, for example. Next, the display control unit 107 executes a second candidate script with respect to the processing target image im12. Thus, the processing target image im12 moves in such a way as to follow a parabola, as is depicted in FIG. 19(b), for example. Next, the display control unit 107 executes a third candidate script with respect to the processing target image im12. Thus, the processing target image im12 rotates as is depicted in FIG. 19(c), for example. Furthermore, the display control unit 107, when executing each candidate script, may display the candidate script being executed in the script display editing region 203.

The user, by seeing the way in which the processing target image im12 changes, or by seeing the displayed candidate script, selects any one candidate script from among the candidate scripts indicated in the script candidate list. For example, the display control unit 107 displays a button for selecting each candidate script on the script generating screen 201, and selects the candidate script corresponding to the button selected by means of an input operation by the user. As a result, the candidate presenting unit 108 acquires information (for example, the script ID) indicating the selected candidate script, via the acquisition unit 102 from the terminal device 200. Thus, the candidate script is generated as an application script to be applied to the processing target image im2.

In this way, in the present modified example, M (N>M≥2) number of second image sets respectively including similar images (in other words, most similar partial images) are specified from N number of second image sets stored in the database DB, by acquiring the similar image list in step S1411 of FIG. 17. Then, in steps S1412 to S1420, from among the scripts associated with the similar images respectively included in the M number of second image sets in the database DB, only scripts having feature values that are different from each other by at least a third threshold value are presented as candidate scripts. Here, the similar images respectively included in the M number of second image sets are images having the largest similarity with the processing target image within each second image set. Next, in step S1421, one candidate script is selected from the presented candidate scripts, and an application script is thereby generated.

Thus, since two or more scripts are presented as candidate scripts, the user is able to select a preferred script as an application script from the two or more candidate scripts. Furthermore, the presented candidate scripts have feature values that are different from each other by at least the third threshold value. That is, the candidate scripts are not similar to each other. Consequently, it is possible to suppress a large number of similar candidate scripts being presented, and it is possible to increase the range of choices for scripts for the user.

Furthermore, in step S1415 of FIG. 17 in the present modified example, the feature values of the scripts associated with the similar images respectively included in the M number of second image sets in the database DB are derived as script vectors. Then, from among the M number of scripts respectively having the derived script vectors, only scripts that have script vectors having a cosine distance that is less than a fourth threshold value with respect to each other are presented as candidate scripts.

Thus, similar scripts can be appropriately excluded from the M number of scripts, and only scripts that are not similar to each other can be presented as candidate scripts.

(Summary)

Figure 20:
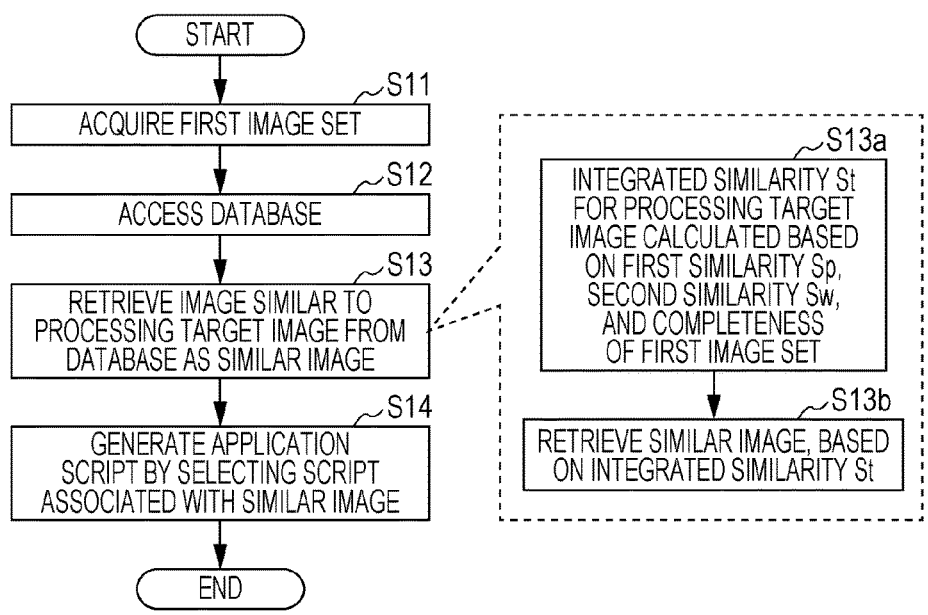
FIG. 20 is a flowchart depicting an example of a program generating method according to an aspect of the present disclosure.

FIG. 20 is a flowchart depicting an example of a program generating method according to an aspect of the present disclosure.

The program generating method according to an aspect of the present disclosure is a method for generating, as a script, a computer program for changing a displayed image, and includes the processing of the steps S11 to S14. The user uses an input means (a mouse and/or a keyboard, for example) to select an image and/or draw an image, thereby causing that image to be displayed on the display 200d.

In step S11, a first image set that includes one or more images displayed on the display 200d is acquired. In step S12, access is performed to a database DB that stores N (N≥2) number of second image sets and scripts, each of the scripts being associated with a corresponding one of one or more images respectively included in the N number of second image sets. Each of the script is used to change the corresponding one of the one or more images. In step S13, one or more similar images that are similar to a processing target image included in the first image set are retrieved from the database DB. In step S14, one script is selected from the scripts, each of the scripts being associated with a corresponding one of the one or more retrieved similar images in the database DB, and a script to be applied to the processing target image is thereby generated as an application script.

Here, the aforementioned step S13 includes steps S13a and S13b. In step S13a, for each of the N number of second image sets stored in the database DB, the integrated similarity St of an image included in the second image set with respect to the processing target image is calculated. At such time, the integrated similarity St is calculated based on a first similarity Sp between the image included in the second image set and the processing target image, a second similarity Sw between the second image set and the first image set, and the completeness of the first image set. In step S13b, one or more similar images are retrieved based on the integrated similarity St, which is calculated for images respectively included in the N number of second image sets stored in the database DB.

Thus, one or more similar images that are similar to the processing target image drawn as an input image are retrieved, and one script is selected as an application script from the scripts each of which is associated with a corresponding one of the one or more similar images. As a result, a script to be applied to the processing target image is automatically generated. Consequently, it is not necessary for the user who has drawn the input image on the display 200d, to create a script to be applied to the input image by combining several types of commands prepared in advance. As a result, a script for changing the input image can be easily generated.

Furthermore, in the program generating method according to an aspect of the present disclosure, the integrated similarity St of an image included in a second image set with respect to the processing target image is calculated based on the first similarity Sp, the second similarity Sw, and the completeness of the first image set. That is, an integrated similarity St that is based on the overall similarity, the partial similarity, and the completeness of the first image set is calculated, and similar images are retrieved using that integrated similarity St.

For example, in the case where an image depicting a ball is included in a second image set, and the processing target image of the first image set depicts a ball, those images are similar to each other if only those images are compared. However, the entire second image set may depict a baseball scene, for example, and the entire first image set may depict a tennis or golf scene, for example. In a case such as this, it cannot be said that the image depicting the ball included in the second image set is similar to the processing target image depicting the ball included in the first image set. Furthermore, the reliability of the overall similarity between the second image set and the first image set is low if the completeness of the first image set is low, and, conversely, the reliability of the overall similarity between the second image set and the first image set is high if the completeness of the first image set is high.

Thus, in the program generating method according to an aspect of the present disclosure, as mentioned above, an integrated similarity St that is based on the overall similarity, the partial similarity, and the completeness of the first image set is calculated, and similar images are retrieved using that integrated similarity St. Consequently, appropriate similar images can be retrieved with respect to the processing target image. As a result, a script that is more suitable for the processing target image can be generated.

Hereinabove, a program generating device and a program generating method according to one or more aspects have been described based on an embodiment and a modified example thereof; however, the present disclosure is not limited to this embodiment or the like. Modes in which various modifications conceived by those skilled in the art have been implemented in the present embodiment or the modified example thereof, and modes constructed by combining constituent elements in the embodiment and the modified example may also be included in the scope of the present disclosure provided they do not depart from the purpose of the present disclosure.

For example, in the aforementioned embodiment and the modified example thereof, the program generating device displayed and changed an input image on the display 200d of the terminal device 200 via the communication network 300; however, the input image may be changed without the terminal device 200 communicating with the program generating device. That is, the terminal device 200 may generate a script and change the input image by executing that script. In this case, for example, the terminal device 200 downloads, from the program generating device 100, for example, a control program for realizing the functions of the program generating device 100. The terminal device 200 then executes that control program and thereby generates a script and changes the input image in a manner similar to the aforementioned embodiment or the modified example thereof.

Furthermore, in the aforementioned embodiment and the modified example thereof, a script was generated as a computer program; however, the generated computer program is not limited to a specific programming language, and may be a program of any type of language.

It should be noted that, in the aforementioned embodiment and the modified example thereof, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes the program generating device or the like of the aforementioned embodiment causes a computer to execute each step included in the flowcharts depicted in FIGS. 8, 10 to 13, 15, 17, and 20.

Furthermore, in the present disclosure, all or some of the units and devices, or all or some of the functional blocks of the block diagrams depicted in FIG. 4 or 16 may be executed by one or more electronic circuits including a semiconductor device, a semiconductor integrated circuit (IC), or a large-scale integration (LSI). An LSI or an IC may be integrated in one chip or may be configured by combining chips. For example, function blocks other than storage elements may be integrated in one chip. Here, reference has been made to an LSI and an IC; however, the name that is used changes depending on the degree of integration, and reference may be made to a system LSI, a very-large-scale integration (VLSI), or an ultra-large-scale integration (ULSI). A field programmable gate array (FPGA) that is programmed after manufacturing an LSI, or a reconfigurable logic device that allows reconfiguration of the connection relationship within an LSI or the setting up of circuit cells within an LSI can be used for the same purpose.

In addition, it is possible for all or some of the functions or operations of the units, devices, or some of the devices to be executed by software processing. In this case, software is recorded in a non-transitory recording medium such as one or more ROMs, optical discs, or hard disk drives, and in the case where the software is executed by a processor, the software causes specific functions within the software to be executed by the processor and peripheral devices. The system or the device may include one or more non-transitory recording mediums on which the software is recorded, a processor, and a required hardware device such as an interface.

The present disclosure demonstrates the effect of being capable of easily generating a computer program for changing an image, and, for example, can be applied to a system for learning programming, or the like.

What is claimed is:

1. A program generating method, comprising:
    obtaining a first image, including first pictures, that is prepared by a user and displayed on a display, the preparation including the user drawing, coloring, and/or copying using one or more input devices;
    receiving information indicating a picture designated from among the first pictures by the user;
    receiving a first time indicating how much time has been taken for the preparation;
    calculating a completion value by dividing the first time by a predetermined time;
    calculating a first weight value and a second weight value using the completion value, the first weight value being a first value and the second weight value being a second value when the completion value is bigger than a predetermined value, the first weight value being a third value and the second weight value being a fourth value when the completion value is equal to or smaller than the predetermined value, the first value being smaller than the second value, and the third value being bigger than the fourth value;
    accessing a recording medium storing computer programs and second images including second pictures, the second pictures each corresponding to the computer programs, each of the computer programs being used to change the corresponding picture, each of the second images including third pictures that are included in the second pictures;

calculating first similarity values, each of the first similarity values being a similarity value between the designated picture and one of the second pictures, first similarity values each corresponding to the second pictures;

selecting second similarity values from among the first similarity values, each of the second similarity values being selected from among similarity values, included in the first similarity values, corresponding to the third pictures and a highest similarity value among the selected similarity values, the second similarity values each corresponding to the second images;

calculating third similarity values, each of the third similarity values being a similarity value between the first image and one of the second images, the third similarity values each corresponding to the second images;

calculating fourth similarity values, each of the fourth similarity values being obtained by adding a fifth value and a sixth value, the fifth value being obtained by multiplying the first weight by a second similarity value included in the second similarity values, the sixth value being obtained by multiplying the second weight by a third similarity value, corresponding to the second similarity value, included in the third similarity values, and the fourth similarity values each corresponding to the second images;

checking whether each of the fourth similarity values is equal to or bigger than a predetermined value and selecting a second image, included in the second images, corresponding to each of the fourth similarity values when the checking result is affirmed;

selecting a third image from among one or more second images selected, the third image having a highest similarity value among similarity values between the first image and the one or more second images selected;

selecting a third picture from among pictures included in the third image, the third picture having a highest similarity value among similarity values between the designated picture and the pictures included in the third image; and outputting a computer program, from among the computer programs, corresponding to the third picture, to display to the user.

2. The program generating method according to claim 1, wherein each of the second images have a corresponding second similarity value that is equal to or greater than a first threshold value.

3. The program generating method according to claim 1, wherein the first weight is a value that decreases as the completion value increases, and the second weight is a value that increases as the completion value increases.

4. The program generating method according to claim 3, wherein, when the completion value is equal to or less than a second threshold value, the first weight is 1 and the second weight is 0, and when the completion value exceeds the second threshold value, the first weight is 0 and the second weight is 1.

5. The program generating method according to claim 1, wherein only computer programs having feature values that are different from each other by at least a third threshold value are presented as candidate programs from among the computer programs corresponding to the third pictures that are included in the second pictures included in the second images in the recording medium, and wherein the output computer program is selected from the candidate programs.

6. The program generating method according to claim 5, wherein the feature values of the computer programs are derived as vectors, and wherein only the computer programs that have vectors of a cosine distance that is less than a fourth threshold value with respect to each other are included in the candidate programs.

7. A program generating device, comprising:

an interface for accessing a recording medium storing computer programs and second images including second pictures, the second pictures each corresponding to the computer programs, each of the computer programs being used to change the corresponding picture, each of the second images including third pictures that are included in the second pictures; and a processing circuit, the processing circuit:

obtaining a first image, including first pictures, that is prepared by a user and displayed on a display, the preparation including the user drawing, coloring, and/or copying using one or more input devices;

receiving information indicating a picture designated from among the first pictures by the user;

receiving a first time indicating how much time has been taken for the preparation;

calculating a completion value by dividing the first time by a predetermined time;

calculating a first weight value and a second weight value using the completion value, the first weight value being a first value and the second weight value being a second value when the completion value is bigger than a predetermined value, the first weight value being a third value and the second weight value being a fourth value when the completion value is equal to or smaller than the predetermined value, the first value being smaller than the second value, and the third value being bigger than the fourth value;

calculating first similarity values, each of the first similarity values being a similarity value between the designated picture and one of the second pictures, first similarity values each corresponding to the second pictures;

selecting second similarity values from among the first similarity values, each of the second similarity values being selected from among similarity values, included in the first similarity values, corresponding to the third pictures and a highest similarity value among the selected similarity values, the second similarity values each corresponding to the second images;

calculating third similarity values, each of the third similarity values being a similarity value between the first image and one of the second images, the third similarity values each corresponding to the second images;

calculating fourth similarity values, each of the fourth similarity values being obtained by adding a fifth value and a sixth value, the fifth value being obtained by multiplying the first weight by a second similarity value included in the second similarity values, the sixth value being obtained by multiplying the second weight by a third similarity value, corresponding to the second similarity value, included in the third similarity values, and the fourth similarity values each corresponding to the second images;

checking whether each of the fourth similarity values is equal to or bigger than a predetermined value and selecting a second image, included in the second images, corresponding to each of the fourth similarity values when the checking result is affirmed;

selecting a third image from among one or more second images selected, the third image having a highest similarity value among similarity values between the first image and the one or more second images selected;

selecting a third picture from among pictures included in the third image, the third picture having a highest similarity value among similarity values between the designated picture and the pictures included in the third image; and outputting a computer program, from among the computer programs, corresponding to the third picture, to display to the user.

8. A non-transitory computer recording medium storing a control program for causing a device including a processor to execute processing, the processing including:

obtaining a first image, including first pictures, that is prepared by a user and displayed on a display, the preparation including the user drawing, coloring, and/or copying using one or more input devices;

receiving information indicating a picture designated from among the first pictures by the user;

receiving a first time indicating how much time has been taken for the preparation;

calculating a completion value by dividing the first time by a predetermined time;

calculating a first weight value and a second weight value using the completion value, the first weight value being a first value and the second weight value being a second value when the completion value is bigger than a predetermined value, the first weight value being a third value and the second weight value being a fourth value when the completion value is equal to or smaller than the predetermined value, the first value being smaller than the second value, and the third value being bigger than the fourth value;

accessing a recording medium storing computer programs and second images including second pictures, the second pictures each corresponding to the computer programs, each of the computer programs being used to change the corresponding picture, each of the second images including third pictures that are included in the second pictures;

calculating first similarity values, each of the first similarity values being a similarity value between the designated picture and one of the second pictures, first similarity values each corresponding to the second pictures;

selecting second similarity values from among the first similarity values, each of the second similarity values being selected from among similarity values, included in the first similarity values, corresponding to the third pictures and a highest similarity value among the selected similarity values, the second similarity values each corresponding to the second images;

calculating third similarity values, each of the third similarity values being a similarity value between the first image and one of the second images, the third similarity values each corresponding to the second images;

calculating fourth similarity values, each of the fourth similarity values being obtained by adding a fifth value and a sixth value, the fifth value being obtained by multiplying the first weight by a second similarity value included in the second similarity values, the sixth value being obtained by multiplying the second weight by a third similarity value, corresponding to the second similarity value, included in the third similarity values, and the fourth similarity values each corresponding to the second images;

checking whether each of the fourth similarity values is equal to or bigger than a predetermined value and selecting a second image, included in the second images, corresponding to each of the fourth similarity values when the checking result is affirmed;

selecting a third image from among one or more second images selected, the third image having a highest similarity value among similarity values between the first image and the one or more second images selected;

selecting a third picture from among pictures included in the third image, the third picture having a highest similarity value among similarity values between the designated picture and the pictures included in the third image; and outputting a computer program, from among the computer programs, corresponding to the third picture, to display to the user.

\* \* \* \* \*